United States Patent
Osawa et al.

(10) Patent No.: US 12,459,181 B2
(45) Date of Patent: *Nov. 4, 2025

(54) LAYERED BODY AND EXTRUSION-MOLDED ARTICLE

(71) Applicant: DAIKIN INDUSTRIES, LTD., Osaka (JP)

(72) Inventors: Kozue Osawa, Osaka (JP); Yuuki Kuwajima, Osaka (JP); Masayuki Tsuji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 220 days.

This patent is subject to a terminal disclaimer.

(21) Appl. No.: 17/849,530

(22) Filed: Jun. 24, 2022

(65) Prior Publication Data

US 2023/0001616 A1    Jan. 5, 2023

Related U.S. Application Data

(63) Continuation of application No. 17/736,513, filed on May 4, 2022, which is a continuation of application No. PCT/JP2020/039986, filed on Oct. 23, 2020.

(30) Foreign Application Priority Data

Nov. 5, 2019   (JP) .................. 2019-200567

(51) Int. Cl.
*B29C 48/00*    (2019.01)
*B29K 27/18*    (2006.01)
*B32B 27/08*    (2006.01)

(52) U.S. Cl.
CPC ........ *B29C 48/0021* (2019.02); *B29C 48/022* (2019.02); *B32B 27/08* (2013.01); *B29K 2027/18* (2013.01); *B32B 2327/18* (2013.01)

(58) Field of Classification Search
CPC . B29C 48/0021; B32B 27/08; B29K 2027/18; B29K 2327/18
See application file for complete search history.

(56) References Cited

U.S. PATENT DOCUMENTS 3,726,483 A      4/1973 Kometani et al.
10,421,257 B2 *  9/2019 Kuwajima ............ B32B 27/322
(Continued)

FOREIGN PATENT DOCUMENTS

CN    110087878 A    8/2019
EP    3 135 485 A1   3/2017
(Continued)

OTHER PUBLICATIONS

English machine translation for WO2018123448. (Year: 2018).*
(Continued)

*Primary Examiner* — Michael C Miggins
(74) *Attorney, Agent, or Firm* — Sughrue Mion, PLLC

(57) ABSTRACT

A tube or a hose including a fluoroelastomer and a polytetrafluoroethylene, the tube or the hose being an extruded article. The polytetrafluoroethylene is dispersed in a state of single particles in the extruded article, or the polytetrafluoroethylene has a specific surface area of less than 8 m²/g. Also disclosed is an extruded laminate including a fluoroelastomer layer formed form the tube or hose and a polymer layer.

10 Claims, 4 Drawing Sheets

(56) References Cited

U.S. PATENT DOCUMENTS

| | | | |
|---|---|---|---|
| 11,673,376 B2* | 6/2023 | Osawa | B32B 27/08 |
| | | | 428/421 |
| 11,780,212 B2* | 10/2023 | Kuwajima | B32B 27/304 |
| | | | 428/421 |
| 2007/0015889 A1 | 1/2007 | Morgan | |
| 2017/0043560 A1 | 2/2017 | Kuwajima et al. | |
| 2019/0344545 A1 | 11/2019 | Osawa et al. | |

FOREIGN PATENT DOCUMENTS

| | | |
|---|---|---|
| JP | 2013-057057 A | 3/2013 |
| JP | 2015-214145 A | 12/2015 |
| KR | 10-1662007 B1 | 10/2016 |
| KR | 10-2019-0082889 A | 7/2019 |
| WO | 2018/123448 A1 | 7/2018 |

OTHER PUBLICATIONS

International Search Report of PCT/JP2020/039986 dated Dec. 22, 2020 [PCT/ISA/210].

Extended European Search Report Dated Oct. 18, 2023 in Application No. 20885222.8.

International Preliminary Report on Patentability with the translation of Written Opinion dated May 10, 2022 from the International Bureau in related International Application No. PCT/JP2020/039986.

* cited by examiner

LAYERED BODY AND EXTRUSION-MOLDED ARTICLE

CROSS-REFERENCE TO RELATED APPLICATIONS

This application is a Rule 53(b) Continuation of U.S. application Ser. No. 17/736,513 filed May 4, 2022, which is a Rule 53(b) Continuation of International Application No. PCT/JP2020/039986 filed Oct. 23, 2020, which claims priority based on Japanese Patent Application No. 2019-200567 filed Nov. 5, 2019, the respective disclosures of which are incorporated herein by reference in their entirety.

TECHNICAL FIELD

The present disclosure relates to a laminate comprising a polymer layer and a fluoroelastomer layer, and an extruded article containing fluoroelastomer.

BACKGROUND ART

A current rise in environmental awareness promotes preparation of legal frameworks for preventing fuel volatilization. In particular, the field of automobiles, mainly in the United States, shows a significant tendency of suppressing fuel volatilization and has an increasing need for materials having excellent lower fuel permeability.

Specifically, laminated hoses including a fluororesin barrier layer (layers other than the barrier layer are rubber layers) for achieving favorably low fuel permeability are used as fuel-transporting elastomer hoses. Still, a recent strong demand for reduction in environmental load causes a demand for much lower fuel permeability.

Patent document 1 discloses a laminate comprising a fluoroelastomer layer (A); and a fluororesin layer (B) laminated on the fluoroelastomer layer (A), the fluoroelastomer layer (A) being a layer formed from a fluoroelastomer composition, the fluoroelastomer composition containing a fluoroelastomer, a basic polyfunctional compound, and at least one compound (a) selected from the group consisting of a fluororesin (a1) and a phosphorus compound (a2), the compound (a) being present in an amount of 0.01 to 120 parts by mass relative to 100 parts by mass of the fluoroelastomer, the fluororesin layer (B) being formed from a fluororesin (b1) having a fuel permeability coefficient of 2.0 g·mm/m$^2$/day or less.

CITATION LIST

Patent Literature

Patent Literature 1: International Publication No. WO2018/123448

SUMMARY

According to the present disclosure, there is provided a laminate comprising a fluoroelastomer layer and a polymer layer, wherein the fluoroelastomer layer is formed of a fluoroelastomer composition containing a fluoroelastomer, a basic polyfunctional compound, and a polytetrafluoroethylene, and the polytetrafluoroethylene is dispersed in a state of single particles in the fluoroelastomer layer.

Effects

According to the present disclosure, it is possible to provide a laminate in which the fluoroelastomer layer and the polymer layer are adhered with sufficient adhesive strength, and the shrinkage of the fluoroelastomer layer when the fluoroelastomer is crosslinked can be suppressed.

Further, according to the present disclosure, it is possible to provide an extruded article capable of suppressing shrinkage during crosslinking.

DESCRIPTION OF EMBODIMENTS

Figure 1A:
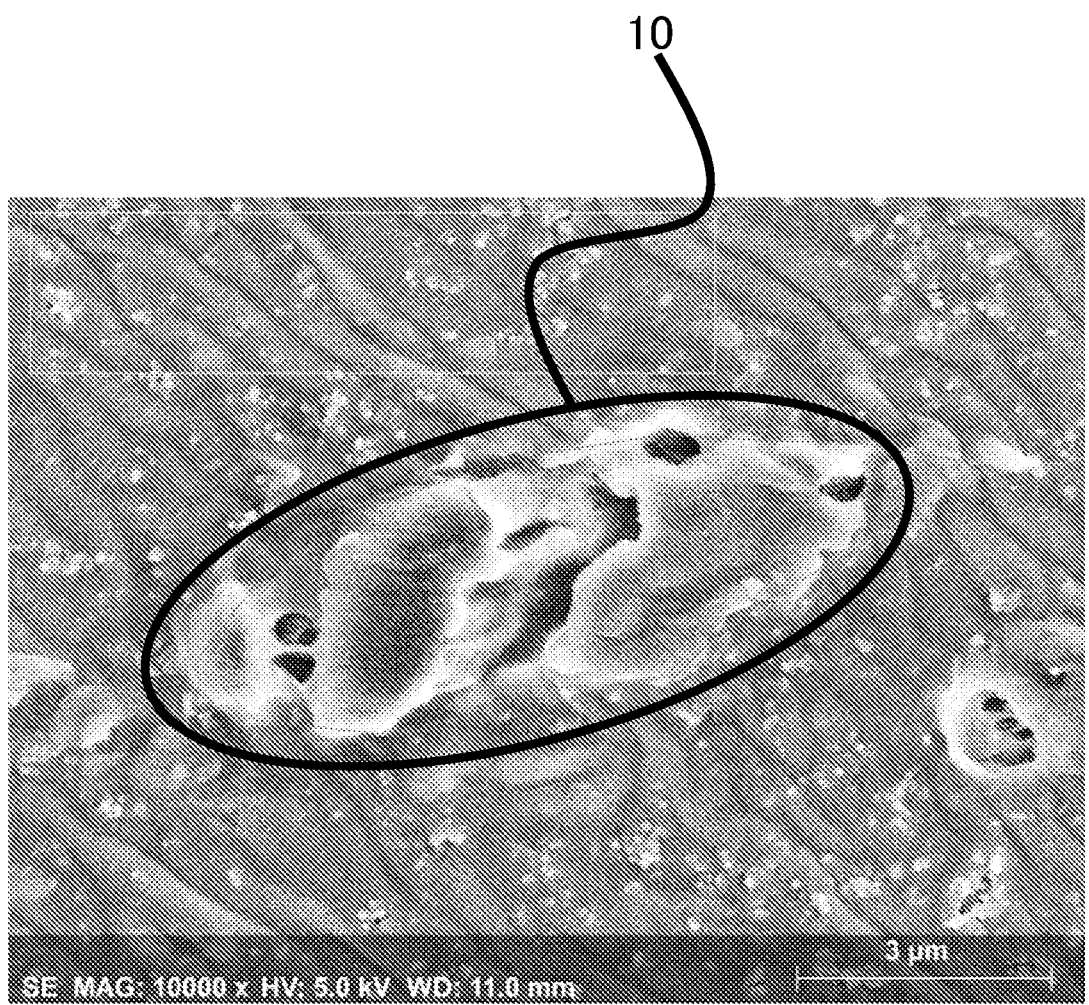
FIG. 1A is an electron micrograph of a cross-section of a fluoroelastomer sheet produced in Example 2.

Hereinafter, specific embodiments of the present disclosure will be described in detail, but the present disclosure is not limited to the following embodiments.

A laminate of the present disclosure comprises a fluoroelastomer layer and a polymer layer. Hereinafter, each component will be described.

(A) Fluoroelastomer Layer

The fluoroelastomer layer is a layer formed from a fluoroelastomer composition. The fluoroelastomer layer is usually obtained by molding a fluoroelastomer composition to obtain an uncrosslinked fluoroelastomer layer and then subjecting it to a crosslinking treatment.

The fluoroelastomer composition contains a fluoroelastomer, a basic polyfunctional compound, and a polytetrafluoroethylene.

[Fluoroelastomer]

The fluoroelastomer is usually formed from an amorphous polymer having a fluorine atom that is coupled with a carbon atom constituting the main chain and has rubber elasticity. The fluoroelastomer may be formed from one polymer, or may be formed from two or more polymers. The fluoroelastomer usually has no obvious melting point.

The fluoroelastomer is preferably at least one selected from the group consisting of vinylidene fluoride (VdF)/hexafluoropropylene (HFP) copolymers, VdF/HFP/tetrafluoroethylene (TFE) copolymers, TFE/propylene copolymers, TFE/propylene/VdF copolymers, ethylene/HFP copolymers, ethylene/HFP/VdF copolymers, ethylene/HFP/TFE copolymers, VdF/TFE/perfluoro(alkyl vinyl ether) (PAVE) copolymers, VdF/chlorotrifluoroethylene (CTFE) copolymers, and VdF/CHX$^1$=CX$^2$Rf$^1$ copolymers wherein one of X$^1$ and X$^2$ is H and the other is F, and Rf$^1$ is a linear or branched fluoroalkyl group having 1 to 12 carbon atoms. The fluoroelastomer is preferably a non-perfluoroelastomer, more preferably a copolymer containing a polymerized unit derived from vinylidene fluoride (VdF unit).

The VdF unit-containing copolymer is preferably a copolymer containing a VdF unit and a copolymerized unit derived from a fluorine-containing ethylenic monomer (excluding a VdF unit, hereinafter, also referred to as "fluorine-containing ethylenic monomer unit (a)"). The VdF unit-containing copolymer may consist only of a VdF unit and a fluorine-containing ethylenic monomer unit (a), or may further contain a copolymerized unit derived from a monomer copolymerizable with VdF and a fluorine-containing ethylenic monomer (excluding VdF, hereinafter also referred to as "fluorine-containing ethylenic monomer (a)").

The VdF unit-containing copolymer contains, relative to 100 mol % of the total of the VdF unit and the fluorine-containing ethylenic monomer unit (a), preferably 30 to 90 mol % of the VdF unit and 70 to 10 mol % of the fluorine-containing ethylenic monomer unit (a), more preferably 30 to 85 mol % of the VdF unit and 70 to 15 mol % of the fluorine-containing ethylenic monomer unit (a), still more preferably 30 to 80 mol % of the VdF unit and 70 to 20 mol % of the fluorine-containing ethylenic monomer unit (a).

The amount of the copolymerized unit derived from a monomer copolymerizable with VdF and the fluorine-containing ethylenic monomer unit (a) (excluding a VdF unit) is preferably 0 to 10 mol % relative to the total amount of the VdF unit and the copolymerized unit derived from the fluorine-containing ethylenic monomer (a).

Examples of the fluorine-containing ethylenic monomer (a) include fluorine-containing monomers such as TFE, CTFE, trifluoroethylene, HFP, trifluoropropylene, tetrafluoropropylene, pentafluoropropylene, trifluorobutene, tetrafluoroisobutene, PAVE, vinyl fluoride, compounds represented by the general formula (1):

$$CHX^1=CX^2Rf^1 \quad (1)$$

wherein one of $X^1$ and $X^2$ is H and the other is F, and $Rf^1$ is a linear or branched fluoroalkyl group having 1 to 12 carbon atoms;

and fluorovinyl ethers represented by the general formula (2):

$$CFX=CXOCF_2OR^1 \quad (2)$$

wherein Xs are the same as or different from each other, and each represents H, F, or $CF_3$; and $R^1$ represents a linear or branched fluoroalkyl group having 1 to 6 carbon atoms and optionally containing one or two atoms which consist of at least one atom selected from the group consisting of H, Cl, Br, and I, or a cyclic fluoroalkyl group having 5 or 6 carbon atoms and optionally containing one or two atoms which consist of at least one atom selected from the group consisting of H, Cl, Br, and I. In particular, at least one selected from the group consisting of $CH_2=CFCF_3$, fluorovinyl ethers represented by the formula (2), TFE, HFP, and PAVE is preferred, and at least one selected from the group consisting of TFE, HFP, and PAVE is more preferred.

The PAVE is preferably a compound represented by the general formula (3):

$$CF_2=CFO(CF_2CFY^1O)_p-(CF_2CF_2CF_2O)_q-Rf \quad (3)$$

wherein $Y^1$ represents F or $CF_3$; Rf represents a perfluoroalkyl group having 1 to 5 carbon atoms; p represents an integer of 0 to 5; and q represents an integer of 0 to 5.

The PAVE is more preferably perfluoro(methyl vinyl ether) or perfluoro(propyl vinyl ether), still more preferably perfluoro(methyl vinyl ether). Each of these may be used alone or in any combination.

Examples of the monomer copolymerizable with VdF and the fluorine-containing ethylenic monomer (a) include ethylene, propylene, and alkyl vinyl ethers.

Specific preferred examples of such a VdF unit-containing copolymer include at least one copolymer selected from the group consisting of VdF/HFP copolymers, VdF/HFP/TFE copolymers, VdF/CTFE copolymers, VdF/CTFE/TFE copolymers, VdF/PAVE copolymers, VdF/TFE/PAVE copolymers, VdF/HFP/PAVE copolymers, VdF/HFP/TFE/PAVE copolymers, VdF/$CH_2$=$CFCF_3$ copolymers, and VdF/TFE/$CH_2$=$CFCF_3$ copolymers. Particularly preferred among these VdF unit-containing copolymers is at least one copolymer selected from the group consisting of VdF/HFP copolymers and VdF/HFP/TFE copolymers from the viewpoint of heat resistance. These VdF unit-containing copolymers preferably meet the above-described compositional proportions of the VdF unit and the fluorine-containing ethylenic monomer unit (a).

The VdF/HFP copolymer preferably has a mole ratio of VdF/HFP of (45 to 85)/(55 to 15), more preferably (50 to 80)/(50 to 20), still more preferably (60 to 80)/(40 to 20).

The VdF/HFP/TFE copolymer preferably has a molar ratio of VdF/HFP/TFE of 30 to 85/5 to 50/5 to 40, more preferably a molar ratio of VdF/HFP/TFE of 35 to 80/8 to 45/8 to 35, still more preferably a molar ratio of VdF/HFP/TFE of 40 to 80/10 to 40/10 to 30, and most preferably a molar ratio of VdF/HFP/TFE of 40 to 80/10 to 35/10 to 30.

The VdF/PAVE copolymer preferably has a molar ratio of VdF/PAVE of 65 to 90/10 to 35.

The VdF/TFE/PAVE copolymer preferably has a molar ratio of VdF/TFE/PAVE of 40 to 80/3 to 40/15 to 35.

The VdF/HFP/PAVE copolymer preferably has a molar ratio of VdF/HFP/PAVE of 65 to 90/3 to 25/3 to 25.

The VdF/HFP/TFE/PAVE copolymer preferably has a molar ratio of VdF/HFP/TFE/PAVE of 40 to 90/0 to 25/0 to 40/3 to 35, more preferably 40 to 80/3 to 25/3 to 40/3 to 25.

The fluoroelastomer is also preferably a copolymer containing a copolymerized unit derived from a monomer that imparts a crosslinking site. Examples of the monomer that imparts a crosslinking site include iodine-containing monomers such as perfluoro(6,6-dihydro-6-iodo-3-oxa-1-hexene) and perfluoro(5-iodo-3-oxa-1-pentene) described in Japanese Patent Publication No. 5-63482 and Japanese Patent Laid-Open No. 7-316234, bromine-containing monomers described in Japanese Translation of PCT International Application Publication No. 4-505341, cyano group-containing monomers, carboxyl group-containing monomers, and alkoxycarbonyl group-containing monomers described in Japanese Translation of PCT International Application Publication No. 4-505345 and Japanese Translation of PCT International Application Publication No. 5-500070.

The fluoroelastomer is also preferably one having an iodine atom or a bromine atom at an end of the main chain thereof. A fluoroelastomer having an iodine atom or a bromine atom at an end of the main chain thereof can be produced by emulsion polymerization of monomers with a radical initiator in an aqueous medium in the presence of a halogen compound and substantially in the absence of oxygen. A typical halogen compound used may be, for example, a compound represented by the general formula:

$$R^2I_xBr_y$$

wherein x and y each represent an integer of 0 to 2 and satisfy $1 \le x+y \le 2$; and $R^2$ is a saturated or unsaturated fluorohydrocarbon group having 1 to 16 carbon atoms, a saturated or unsaturated chlorofluoro hydrocarbon group having 1 to 16 carbon atoms, a hydrocarbon group having 1 to 3 carbon atoms, or a cyclic hydrocarbon group having 3 to 10 carbon atoms and optionally replaced by an iodine atom or a bromine atom, each of which may optionally contain an oxygen atom.

Examples of the halogen compound include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16- diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substituted benzene, diiodo- and monobromo-substituted benzene, and (2-iodoethyl)- and (2-bromoethyl)-substituted benzene. These compounds may be used alone or in any combination.

In particular, it is preferable to use 1,4-diiodoperfluorobutane or diiodomethane from the viewpoints of polymerization reactivity, crosslinking reactivity, and easy availability.

The fluoroelastomer preferably has a Mooney viscosity ($ML_{1+10}$ (100° C.)) of 5 to 200, more preferably 10 to 150, still more preferably 20 to 100, from the viewpoint of good processability in the production of the fluoroelastomer composition.

The Mooney viscosity can be determined in conformity with ASTM D 1646.

Measurement apparatus: MV2000E, ALPHA TECHNOLOGIES

Rotor rotation speed: 2 rpm

Measurement temperature: 100° C.

The rubber component of the fluoroelastomer composition preferably consists only of the fluoroelastomer.

[Polytetrafluoroethylene]

The fluoroelastomer composition contains polytetrafluoroethylene (PTFE).

The fluoroelastomer layer provided in the laminate of the present disclosure is characterized by the fact that PTFE is dispersed in the fluoroelastomer layer in the state of single particles. Due to such characteristics of the fluoroelastomer layer, in the laminate of the present disclosure, the fluoroelastomer layer and the polymer layer are adhered with sufficient adhesive strength, and the shrinkage of the fluoroelastomer layer when the fluoroelastomer is crosslinked can be suppressed.

When the fluoroelastomer is molded and crosslinked without using a mold, the shape of the fluoroelastomer is not restricted. The shrinkage of the fluoroelastomer layer is particularly observed when the fluoroelastomer is molded and crosslinked without using a mold, for example, when the fluoroelastomer is extruded and then the resulting extrudate is crosslinked by heating. However, when PTFE is dispersed in the fluoroelastomer layer in the state of single particles, shrinkage during crosslinking is suppressed even in the fluoroelastomer layer formed by extrusion molding.

Figure 1B:
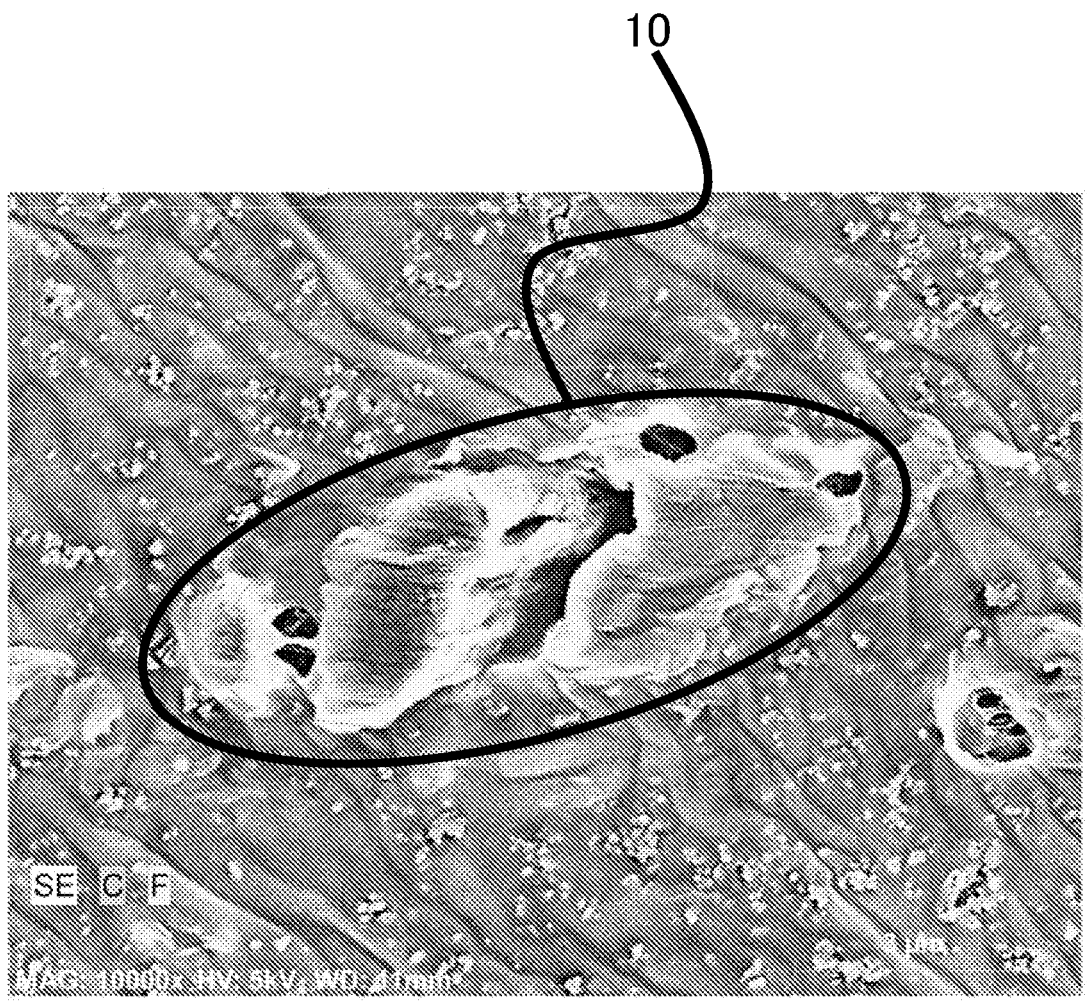
FIG. 1B is an image in which an element mapping image is superimposed on the electron micrograph of the cross-section of the fluoroelastomer sheet produced in Example 2.
Figure 2A:
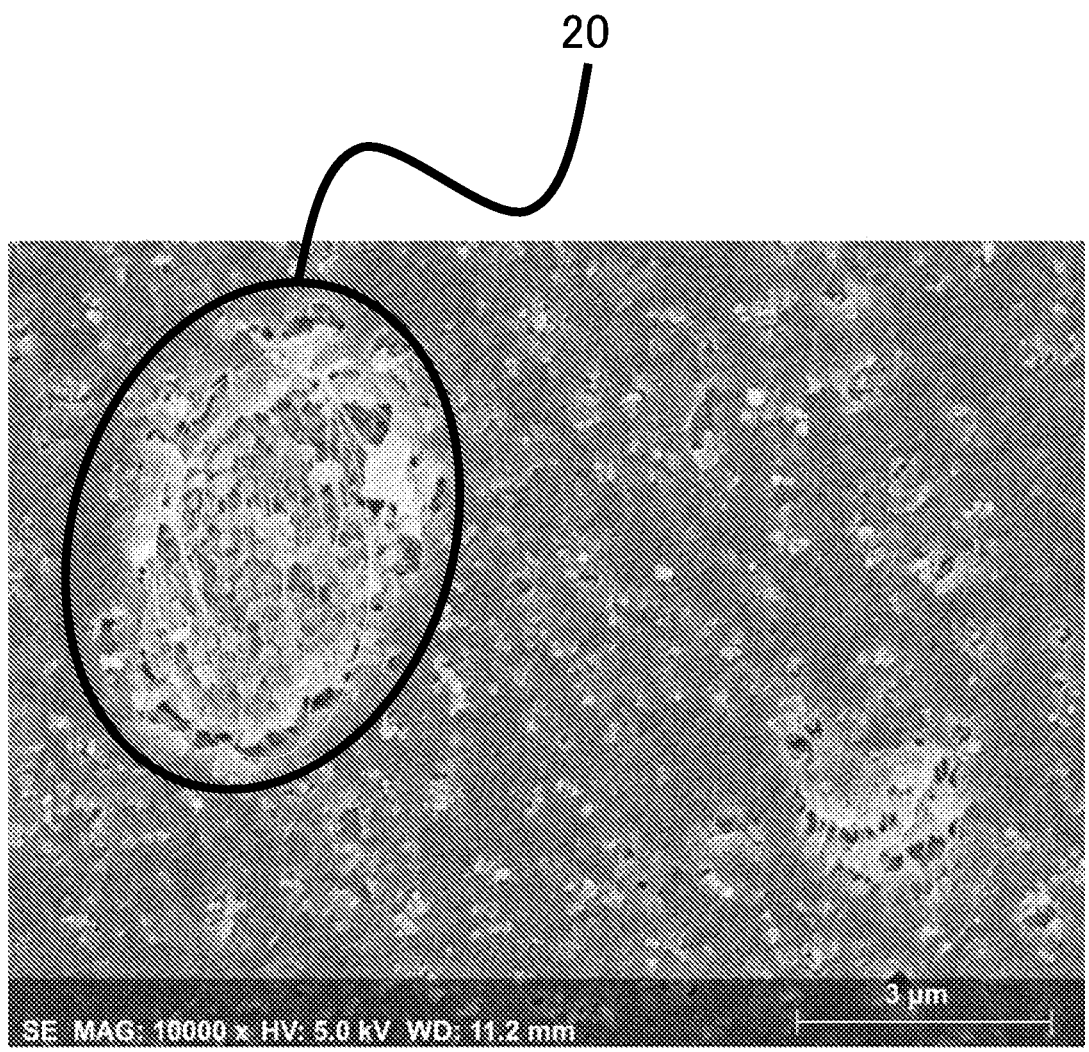
FIG. 2A is an electron micrograph of a cross-section of a fluoroelastomer sheet produced in Comparative Example 1.
Figure 2B:
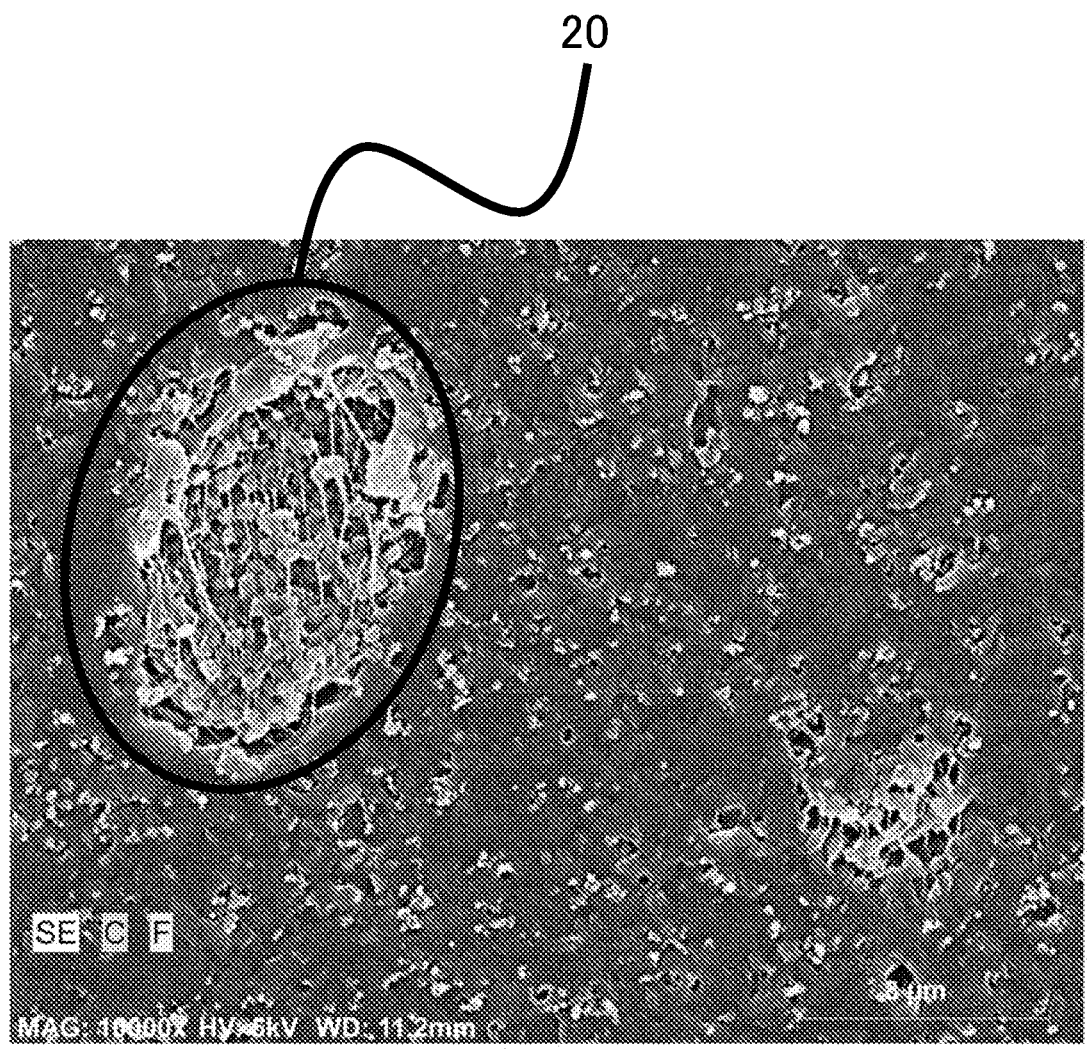
FIG. 2B is an image in which an element mapping image is superimposed on the electron micrograph of the cross-section of the fluoroelastomer sheet produced in Comparative Example 1.

The dispersion state of PTFE in the fluoroelastomer layer will be described in more detail with reference to an electron micrograph of a cross-section of the fluoroelastomer layer. FIGS. 1A and 1B are electron micrographs of the cross-section of the fluoroelastomer sheet produced in Example 2, and show the dispersion state of PTFE in the fluoroelastomer layer provided in the laminate of one embodiment of the present disclosure. Meanwhile, FIGS. 2A and 2B are electron micrographs of the cross-section of the fluoroelastomer sheet produced in Comparative Example 1, and show the dispersion state in the fluoroelastomer layer containing PTFE provided in the conventional laminate.

As shown in the electron micrographs of FIGS. 1A and 1B, the fluoroelastomer layer provided in the laminate of one embodiment of the present disclosure contains PTFE dispersed in the fluoroelastomer, and it can be confirmed that the particles are single particles by observing the cross-section of the PTFE. As shown in the electron micrographs of FIGS. 2A and 2B, the fluoroelastomer layer provided in the conventional laminate also contains PTFE dispersed in the fluoroelastomer, but when the cross-section of PTFE in the fluoroelastomer is observed, a large number of fine particles bonded to each other via elongated branches can be confirmed.

In the laminate of the present disclosure, the PTFE dispersed in the fluoroelastomer is not dispersed in a state of aggregated fine particles as in conventional laminates, but the PTFE is dispersed in a state of single particles in the fluoroelastomer layer. Therefore, shrinkage of the fluoroelastomer layer can be suppressed when the fluoroelastomer is crosslinked.

Further, the fluoroelastomer layer provided in the laminate of the present disclosure is characterized by the specific surface area of PTFE contained in the fluoroelastomer layer being less than 8 m/g. Due to such characteristics of the fluoroelastomer layer, in the laminate of the present disclosure, the fluoroelastomer layer and the polymer layer are adhered with sufficient adhesive strength, and the shrinkage of the fluoroelastomer layer when the fluoroelastomer is crosslinked can be suppressed.

The specific surface area of the PTFE contained in the fluoroelastomer layer is preferably 7.0 m/g or less, more preferably 6.0 m/g or less, still more preferably 5.2 m/g or less, still further preferably 4.0 $m^2/g$ or less, particularly preferably 3.0 $m^2/g$ or less, most preferably 2.5 m/g or less, preferably 0.5 m/g or more, more preferably 1.0 $m^2/g$ or more, and still more preferably 1.4 $m^2/g$ or more.

The specific surface area is measured by the BET method using a surface analyzer (trade name: BELSORP-mini II, manufactured by MicrotracBEL Corp.), using a mixed gas of 30% nitrogen and 70% helium as a carrier gas and using liquid nitrogen for cooling.

The specific surface area of PTFE can be adjusted within the above range by adjusting the polymerization conditions of TFE when producing PTFE. For example, PTFE having a specific surface area within the above range can be easily produced by producing PTFE by suspension polymerization or subjecting it to heat treatment.

Furthermore, by using PTFE having a specific surface area within the above range, PTFE can be easily dispersed in the fluoroelastomer in the state of single particles.

It is preferable that PTFE is melt-fabricable. The melt viscosity of PTFE at 380° C. is preferably $1 \times 10^1$ to $7 \times 10^5$ Pa·s.

A PTFE having a melt viscosity within the above range has a low-molecular weight, and is, for example, a PTFE having a number-average molecular weight of 600,000 or less. A "High-molecular-weight PTFE" having a number-average molecular weight of more than 600,000 exhibits fibrillability distinctive of PTFE (see, for example, Japanese Patent Laid-Open No. 10-147617). A high-molecular-weight PTFE has a high melt viscosity and is non melt-fabricable. It is preferable that the PTFE contained in the fluoroelastomer layer does not exhibits fibrillability to the extent that paste extrusion molding is possible. The melt viscosity and number-average molecular weight of PTFE can be adjusted by adjusting the polymerization conditions of TFE when producing PTFE or by irradiating the PTFE with an electron beam.

The melt viscosity is a value measured by pre-heating a 2-g sample at 380° C. for 5 minutes and keeping it at the above temperature under a load of 0.7 MPa using a flow tester (Shimadzu Corporation) and a 2φ-8 L die in accordance with ASTM D 1238. Each of the number-average molecular weights is a value calculated from the melt viscosity measured in the above manner.

The apparent density of PTFE is preferably 0.15 to 0.80 g/cm$^3$, and more preferably 0.25 to 0.55 g/cm$^3$.

The apparent density can be measured in conformity with JIS K 6891.

The average particle size of PTFE is preferably 0.01 to 1,000 μm, more preferably 0.1 to 100 μm, still more preferably 0.3 to 50 μm, and particularly preferably 0.5 to 20 μm.

The average particle size is considered to be a particle size corresponding to a value of 50% of the cumulative volume in the particle size distribution determined using a laser diffraction type particle size distribution measurement apparatus (for example, manufactured by Japan Laser Corporation) at a pressure of 0.1 MPa and a measurement time of three seconds without cascade.

The melting point of PTFE is preferably 324 to 333° C.

The melting point of PTFE is determined by temperature calibration using a differential scanning calorimeter RDC220 (DSC) manufactured by SII NanoTechnology Inc, using indium and lead as standard samples in advance, placing about 3 mg of PTFE powder in an aluminum pan (crimp container), heating the temperature range of 250 to 380° C. at 10° C./min under an air flow of 200 ml/min, performing differential scanning calorimetry, and using the minimum point of quantity of heat of melting in the above range as the melting point.

The melt flow rate (MFR) of PTFE at 372° C. (load 1.2 kg) is preferably 0.01 to 10 g/10 minutes.

The MFR can be determined by measuring the weight (g) of the polymer flowed out of a nozzle (diameter: 2 mm, length: 8 mm) per unit time (10 minutes) at 372° C. under a load of 1.2 kg using a melt indexer (for example, manufactured by Toyo Seiki Seisaku-sho, Ltd.).

The burning loss (ignition loss) of the PTFE at 300° C. is preferably 0.05% by mass or more, more preferably 0.09% by mass or more, still more preferably 0.15% by mass or more, and particularly preferably 0.30% by mass or more, since the shrinkage of the fluoroelastomer layer can be further suppressed.

The burning loss can be specified by heating PTFE (sample) at 300° C. for 2 hours, measuring the mass of the sample after heating, and calculating the proportion of the weight loss of the sample after heating to the mass of the sample before heating.

The PTFE may be a TFE homopolymer, or may be a modified PTFE containing a TFE unit and a modifying monomer unit copolymerizable with TFE.

In the modified PTFE, the content of the modifying monomer unit copolymerizable with TFE is preferably from 0.01 to 1% by mass, more preferably from 0.01 to 0.5% by mass, and most preferably from 0.03 to 0.3% by mass, based on all monomer units.

In the present disclosure, the "modifying monomer unit" means a portion of the molecular structure of the modified PTFE as a part derived from the modifying monomer, and the "all monomer units" means all the portions derived from monomers in the molecular structure of the modified PTFE. The content of the modifying monomer unit is measured by infrared spectroscopy or NMR (nuclear magnetic resonance).

The modifying monomer in the modified PTFE may be any modifying monomer copolymerizable with TFE, and examples thereof include, but are not limited to, perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; and ethylene. The modifying monomer to be used may be one kind or a plurality of kinds.

Examples of the perfluorovinyl ether include, but are not limited to, a perfluoro unsaturated compound represented by the general formula (1):

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the perfluorovinyl ether include perfluoro (alkyl vinyl ether) (PAVE) in which Rf represents a perfluoroalkyl group having 1 to 10 carbon atoms in the general formula (I). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group, and preferred is perfluoropropyl vinyl ether (PPVE) of which the perfluoroalkyl group is a perfluoropropyl group.

Examples of the perfluorovinyl ether further include those represented by the general formula (I) in which Rf is a perfluoro(alkoxyalkyl) group having 4 to 9 carbon atoms; those in which Rf is a group represented by the following formula:

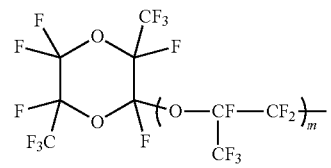

wherein m represents 0 or an integer of 1 to 4; and those in which Rf is a group represented by the following formula:

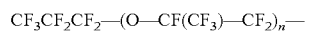

wherein n is an integer of 1 to 4.

Examples of the perfluoroalkylethylene include, but are not limited to, perfluorobutyl ethylene (PFBE), perfluorohexyl ethylene, and perfluorooctyl ethylene.

The modifying monomer in the modified PTFE is preferably at least one monomer selected from the group consisting of HFP, CTFE, VDF, PPVE, PFBE, and ethylene, and more preferably HFP.

The PTFE is preferably a modified PTFE, and more preferably a modified PTFE containing a TFE unit and a polymerized unit derived from HFP (HFP unit).

The content of PTFE in the fluoroelastomer composition is preferably, based on 100 parts by mass of the fluoroelastomer, 0.5 to 100 parts by mass, more preferably 10 parts by mass or more, still more preferably 20 parts by mass or more, more preferably 80 parts by mass or less, still more preferably 60 parts by mass or less, and particularly preferably 45 parts by mass or less, since the fluoroelastomer layer and the polymer layer adhere more firmly to each other.

[Basic Polyfunctional Compound]

The fluoroelastomer composition contains a basic polyfunctional compound, whereby the fluoroelastomer layer and the polymer layer are adhered more firmly. A basic polyfunctional compound is a compound that has two or more functional groups having the same or different structures in one molecule and exhibits basicity.

The functional groups in the basic polyfunctional compound are preferably those exhibiting basicity, and are each preferably at least one selected from the group consisting of —NH$_2$, —NH$_3$+, —NHCOOH, —NHCOO—, —N=CR$^1$R$^2$ (wherein R$^1$ and R$^2$ are each independently an organic group having 0 to 12 carbon atoms), —NR$^3$R$^4$ (wherein R$^3$ and R$^4$ are each independently an organic group having 0 to 12 carbon atoms), —NR$^3$R$^4$R$^5$ (wherein R$^3$, R$^4$, and R$^5$ are each independently an organic group having 0 to 12 carbon atoms), and functional groups to be converted into the above functional groups by heat; more preferably at least one selected from the group consisting of —NH$_2$, —NH$_3$+, —N=CR$^1$R$^2$ (wherein R$^1$ and R$^2$ are defined as described above), and —NR$^3$R$^4$R$^5$ (wherein R$^3$, R$^4$, and R$^5$ are defined as described above); still more preferably at least one selected from the group consisting of —NH$_2$, —NH$_3$+, and —N=CR$^1$R$^2$ (wherein R$^1$ and R$^2$ are defined as described above). The number of functional groups contained in the polyfunctional compound is not limited as long as it is 2 or more, but is preferably 2 to 8, more preferably 2 to 4, still more preferably 2 or 3, and particularly preferably 2.

R$^1$, R$^2$, R$^3$, R$^4$, and R$^5$ are preferably —H or an organic group having 1 to 12 carbon atoms independently, and is preferably —H or a hydrocarbon group having 1 to 12 carbon atoms. The hydrocarbon group may have one or more carbon-carbon double bonds. The hydrocarbon group preferably has 1 to 8 carbon atoms.

It is preferable that R$^1$ is —H or —CH$_3$ and R$^2$ is —CH=CHR$^6$ (R$^6$ is a phenyl group (—C$_6$H$_5$), a benzyl group (—CH$_2$—C$_6$H$_5$), or —H), and it is more preferable that R$^1$ is —H and R$^2$ is —CH=CH—C$_6$H$_5$.

Examples of the basic polyfunctional compound include ethylenediamine, propanediamine, putrescine, cadaverine, hexamethylenediamine, heptanediamine, octanediamine, nonanediamine, decanediamine, undecanediamine, dodecanediamine, phenylenediamine, N,N'-dicinnamylidene-1,6-hexamethylenediamine, N,N,N',N'-tetramethyl-1,6-hexamethylenediamine, N,N'-dimethyl-1,6-hexamethylenediamine, and 6-aminohexylcarbamic acid.

The basic polyfunctional compound contains at least two nitrogen atoms in the molecule and the nitrogen-nitrogen interatomic distance is preferably 5.70 Å or more. The nitrogen-nitrogen interatomic distance is more preferably 6.30 Å or more, still more preferably 7.60 Å or more, particularly preferably 8.60 Å or more. A wide nitrogen-nitrogen interatomic distance can lead to better flexibility of the basic polyfunctional compound, resulting in easy crosslinking.

The nitrogen-nitrogen interatomic distance is calculated in accordance with the following method. That is, the structural optimization of each base is calculated using the density functional theory (program: Gaussian03, density functional: B3LYP, basis function: 6-31G*).

In order to achieve good adhesion of the fluoroelastomer layer and the polymer layer, the basic multifunctional compound is preferably at least one selected from the group consisting of N,N'-dicinnamylidene-1,6-hexamethylene diamine and NH$_2$—(CH$_2$)$_n$—NH$_2$ (wherein n is 5 to 12), more preferably at least one compound selected from the group consisting of hexamethylenediamine and N,N'-dicinnamylidene-1,6-hexamethylenediamine.

In the fluoroelastomer composition, the content of basic polyfunctional compound is preferably, based on 100 parts by mass of the fluoroelastomer, 0.5 parts by mass or more, more preferably 0.6 parts by mass or more, still more preferably 0.8 parts by mass or more, particularly preferably 1.0 parts by mass or more, and most preferably 1.5 parts by mass or more, since the fluoroelastomer layer and the polymer layer adhere more firmly to each other.

Further, in the fluoroelastomer composition, the content of the basic polyfunctional compound is preferably 10 parts by mass or less, more preferably 6 parts by mass or less, still more preferably 5 parts by mass or less, and particularly preferably 3 parts by mass or less, from the viewpoint of crosslinking inhibition and cost.

The fluoroelastomer composition also preferably contains at least one selected from the group consisting of a phosphorus compound and silica.

[Phosphorus Compound]

The fluoroelastomer composition may contain a phosphorus compound. The fluoroelastomer composition contains a phosphorus compound, whereby the fluoroelastomer layer and the polymer layer are adhered more firmly. The phosphorus compound is a compound containing at least one phosphorus atom in one molecule, and examples thereof include phosphines, esters of phosphoric acid, phosphazenes, phosphine oxides, esters of phosphonic acid, and esters of phosphinic acid.

In order to achieve firmer adhering the fluoroelastomer layer and the polymer layer, the phosphorus compound is preferably at least one selected from the group consisting of a phosphine compound represented by the general formula: PR$_3$ (wherein the three Rs are the same as or different from each other, and are each a halogen atom or an organic group), a phosphonium salt, and a phosphine oxide, more preferably the phosphine compound.

The phosphine compound is represented by the general formula: PR$_3$, wherein the three Rs are the same as or different from each other, and are each a halogen atom or an organic group. The phosphine compound encompasses compounds having a structure represented by PR$_3$, such as triphenylphosphine hydrochloride, triphenylphosphine borane, and triphenylphosphine-triphenylborane complexes.

Examples of the organic group include a hydrocarbon group having 1 to 30 carbon atoms and optionally having a substituent. The hydrocarbon group may be linear, branched, monocyclic, or polycyclic, may contain an unsaturated bond, may have aromaticity, and may contain a hetero atom. Examples of the substituent include an alkoxy group, an amino group, a cyano group, an aldehyde group, a carboxylic acid group, a halogen atom, a phosphine group, a phosphon group, and a diphenylphosphino group.

Examples of the phosphine compound include the following compounds.

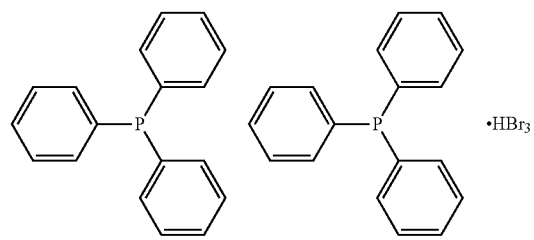

-continued
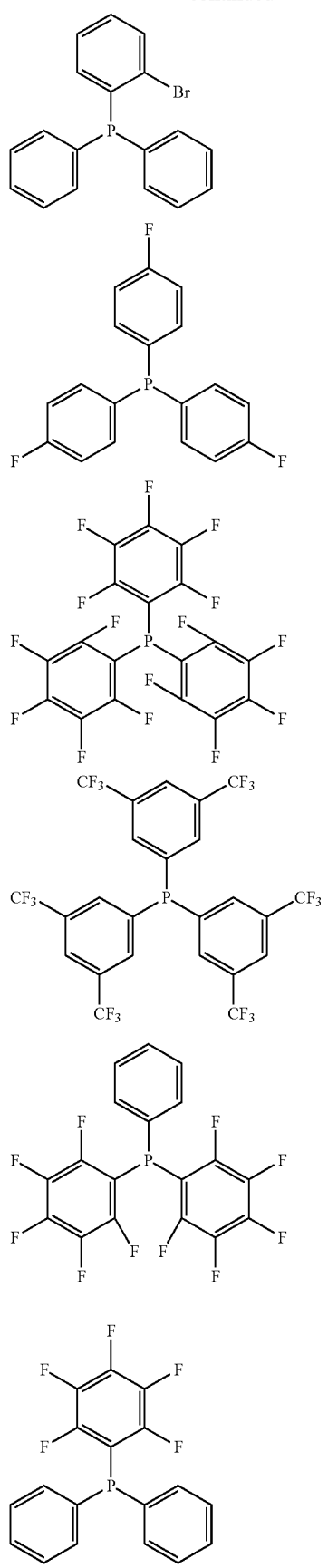
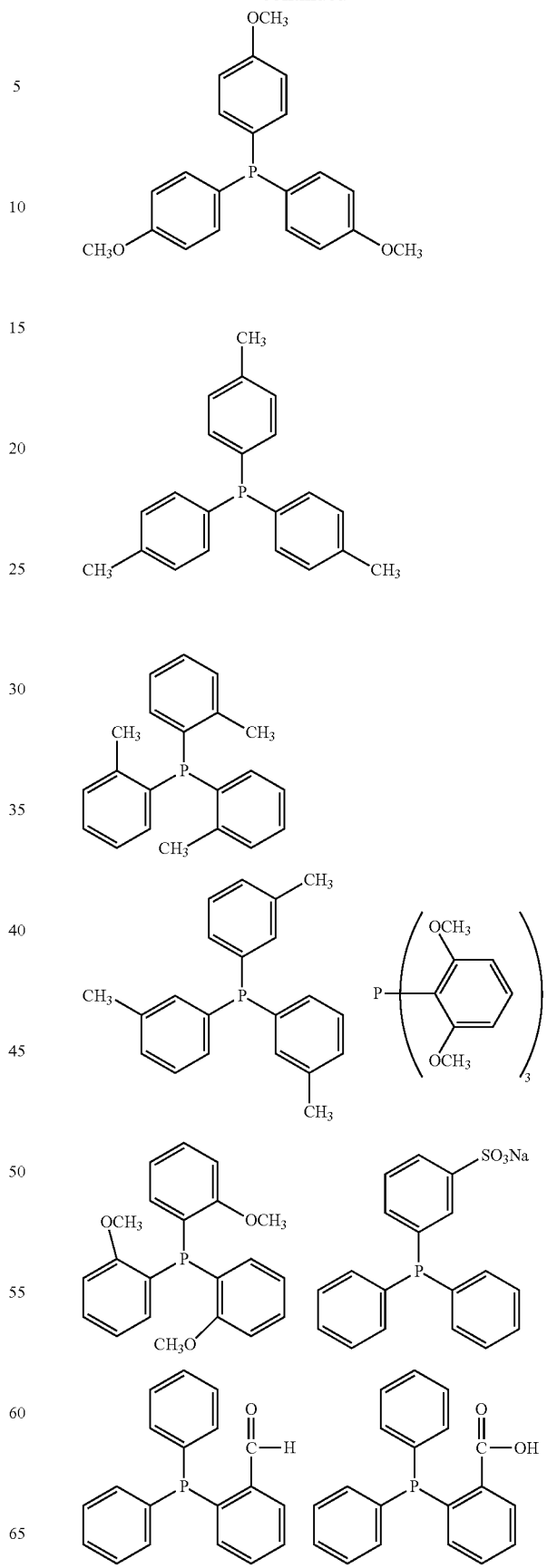

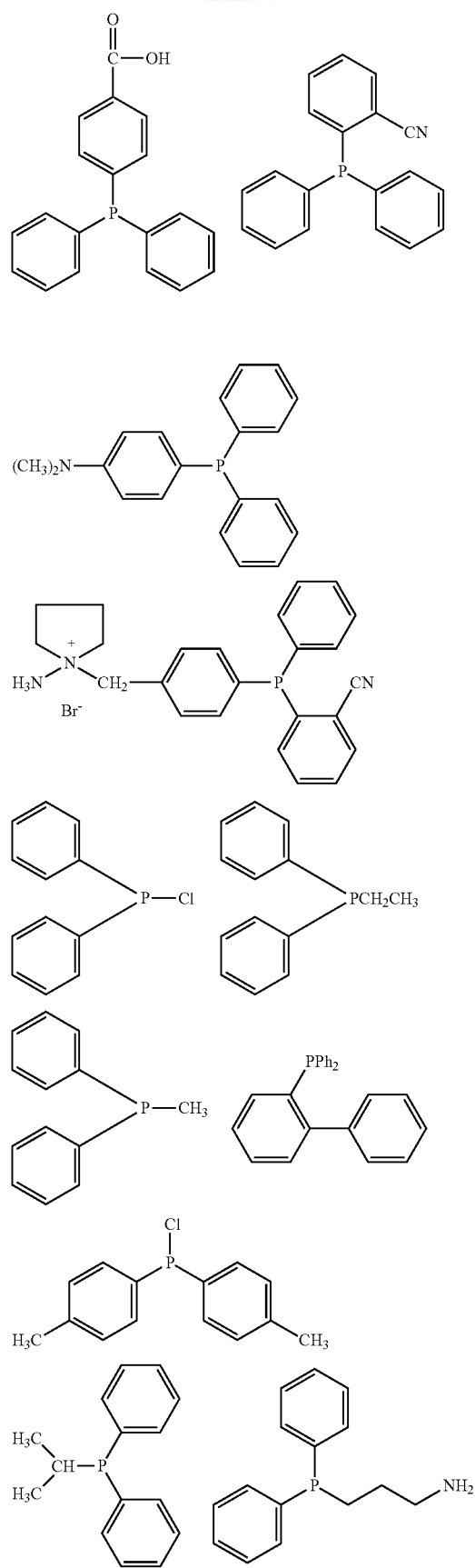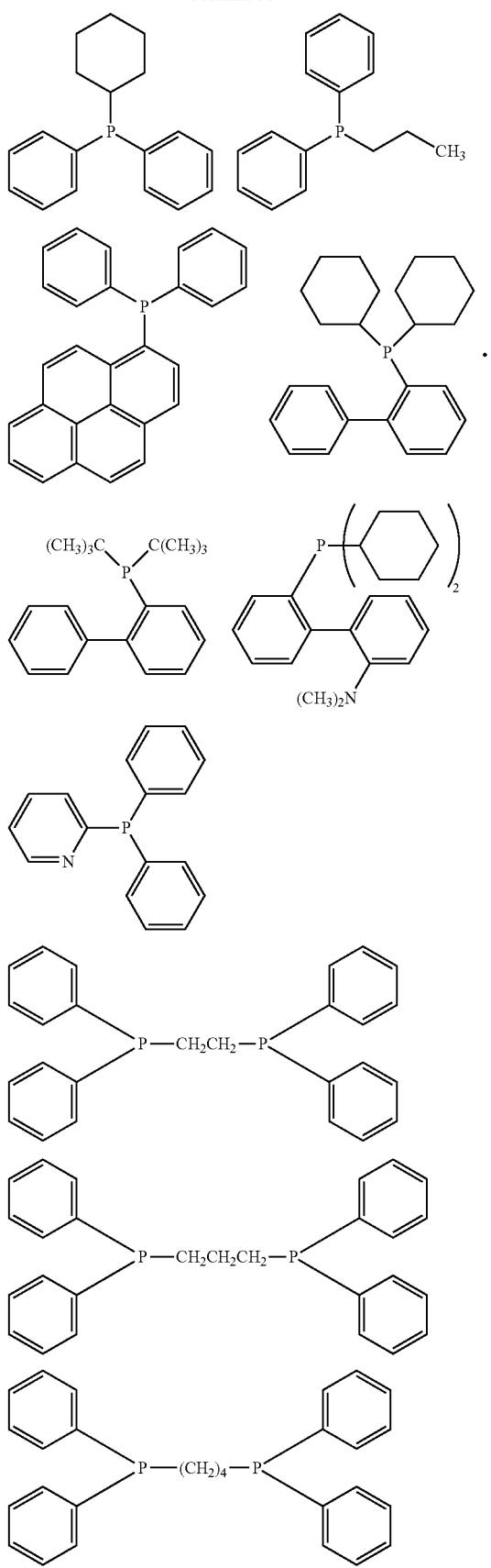

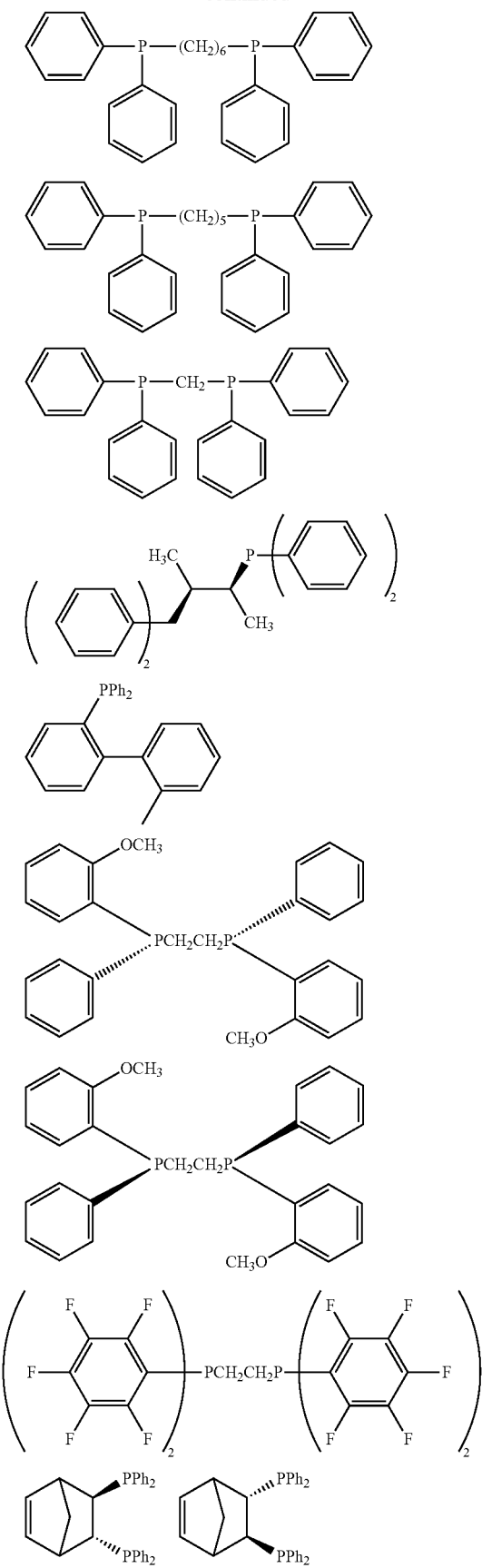
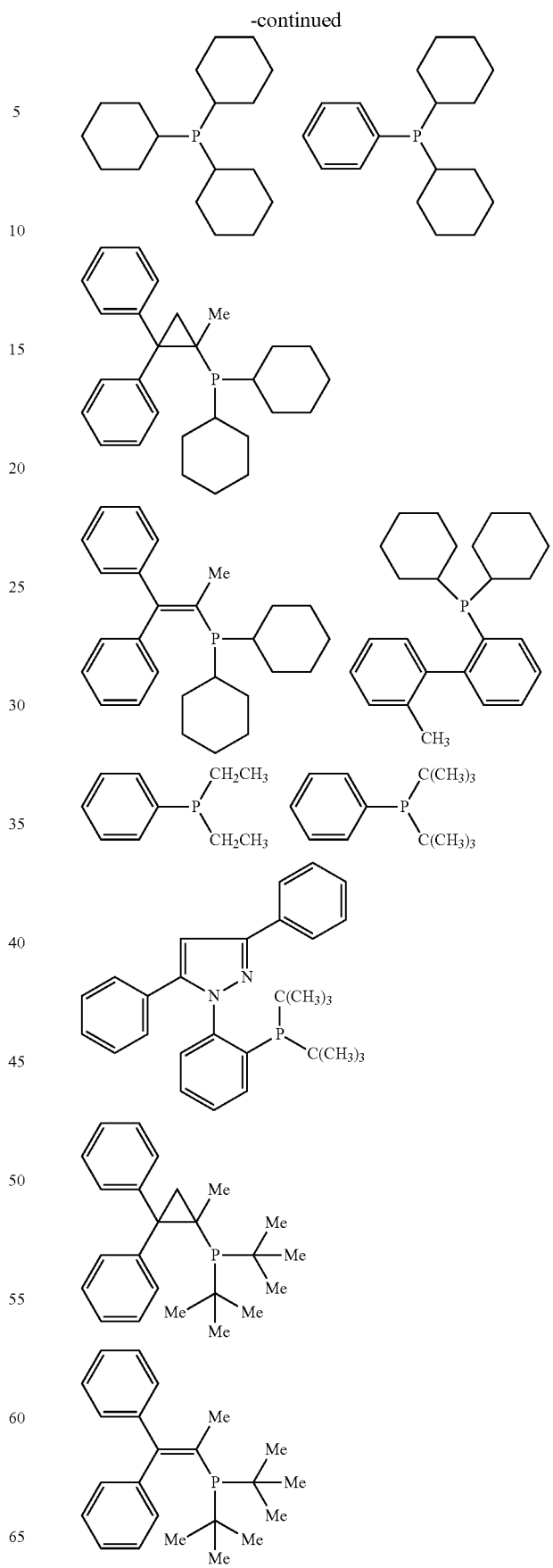

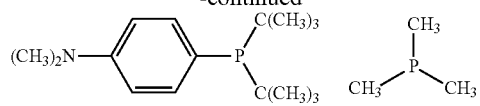
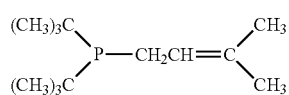
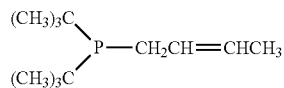
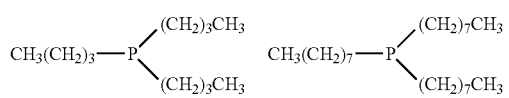
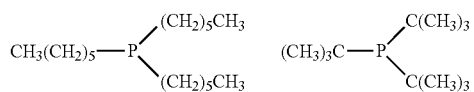
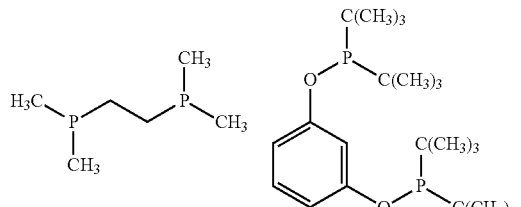
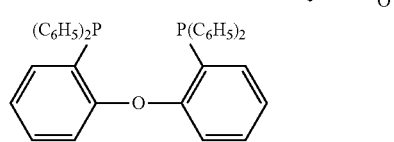
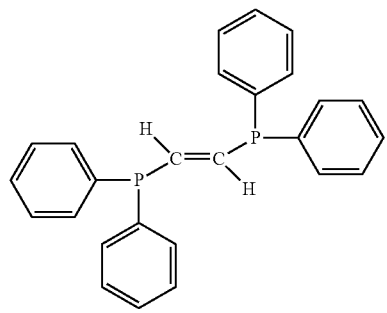
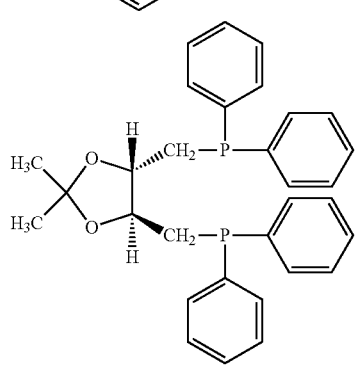
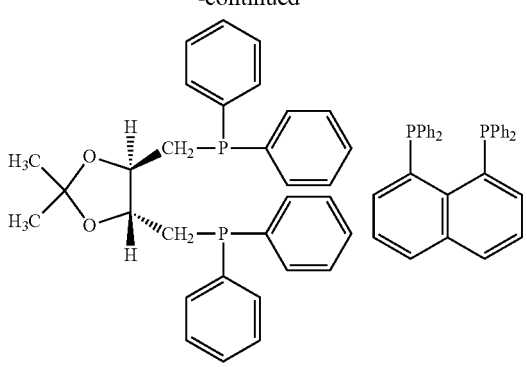
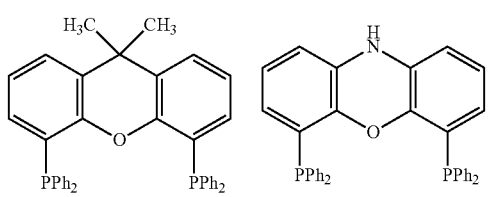
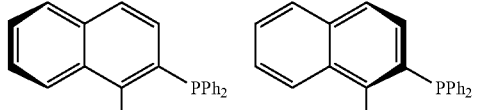
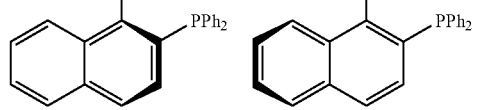
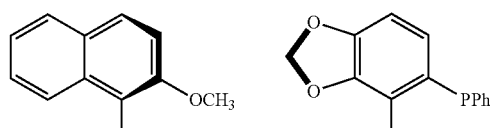
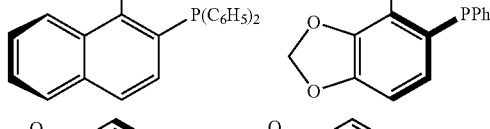
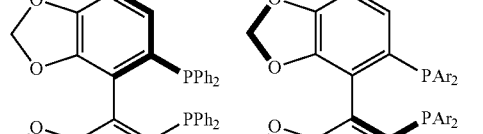
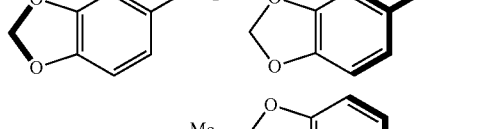
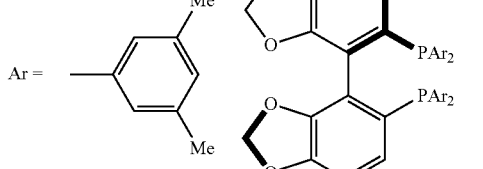
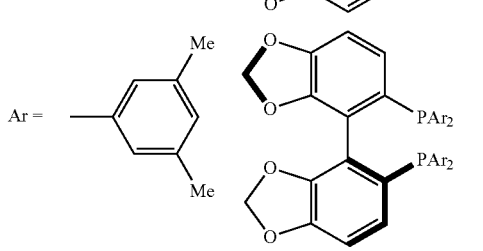

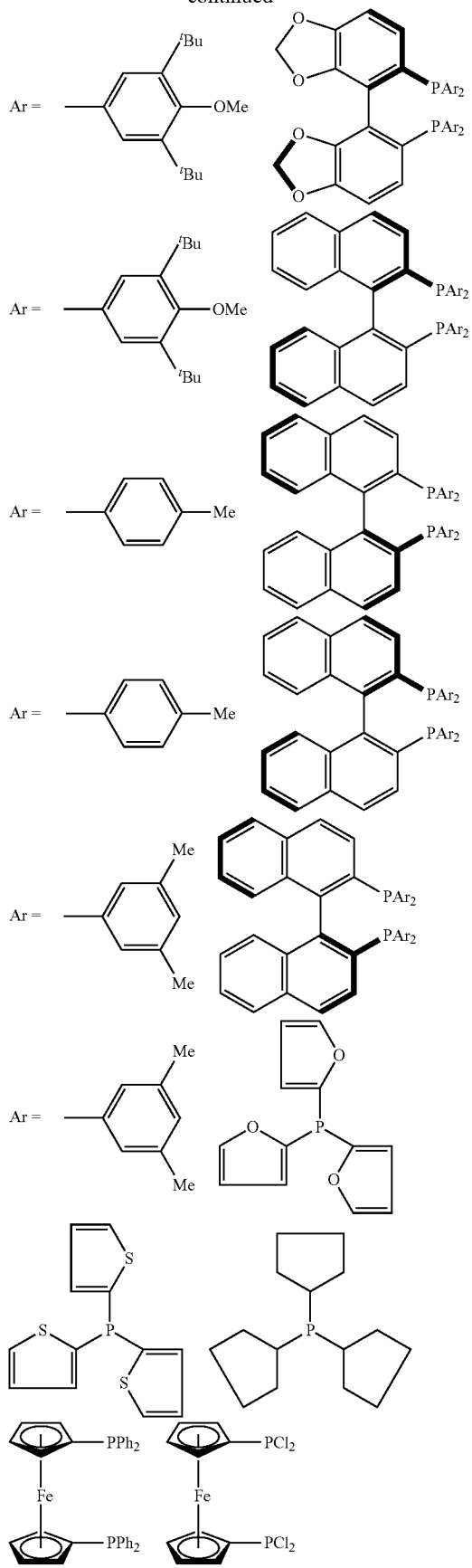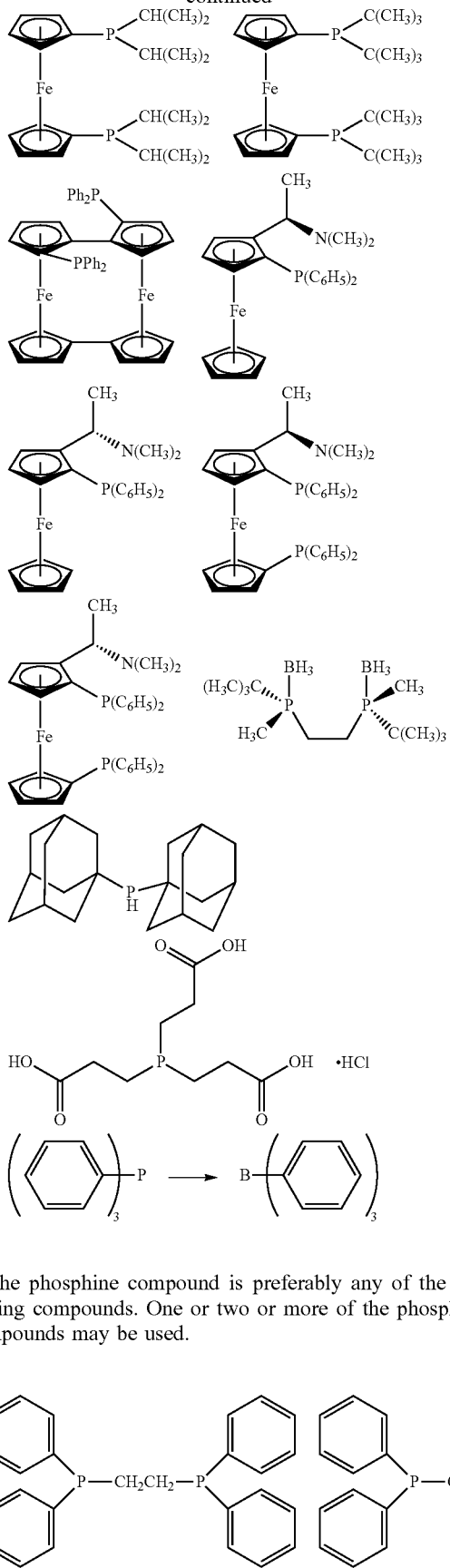
The phosphine compound is preferably any of the following compounds. One or two or more of the phosphine compounds may be used.

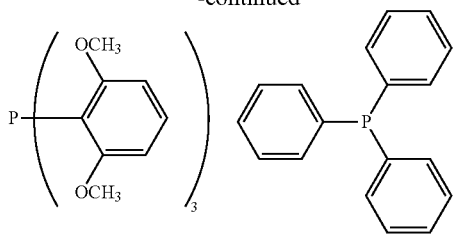

The phosphonium salt is preferably a quaternary phosphonium salt. Examples thereof include tetrabutylphosphonium chloride, benzyltriphenylphosphonium chloride, benzyltrimethylphosphonium chloride, benzyltributylphosphonium chloride, tributylallylphosphonium chloride, tributyl-2-methoxypropylphosphonium chloride, benzylphenyl (dimethylamino)phosphonium chloride, and tributyl (cyanomethyl)phosphonium chloride.

The phosphine oxide is preferably a compound represented by the general formula: $R_3P(=O)$, wherein three Rs are the same or different halogen atoms or organic groups.

Examples of the organic group include a hydrocarbon group having 1 to 30 carbon atoms and optionally having a substituent. The hydrocarbon group may be linear, branched, monocyclic, or polycyclic, may contain an unsaturated bond, may have aromaticity, and may contain a hetero atom. Examples of the substituent include an alkoxy group, an amino group, a cyano group, an aldehyde group, a carboxylic acid group, a halogen atom, a phosphine group, a phosphon group, and a diphenylphosphino group.

The phosphine oxide is preferably the following compound.

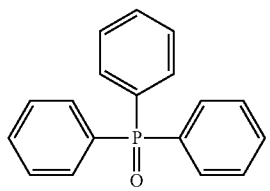 [SMILES: O=P(c1ccccc1)(c1ccccc1)c1ccccc1]

The content of the phosphorus compound in the fluoroelastomer composition is preferably, based on 100 parts by mass of the fluoroelastomer, 0.01 to 20 parts by mass, more preferably 0.05 to 10 parts by mass, still more preferably 0.1 to 5 parts by mass, particularly preferably 0.2 to 3 parts by mass, and most preferably 0.2 to 1 parts by mass, since the fluoroelastomer layer and the polymer layer adhere more firmly to each other.

[Silica]

The fluoroelastomer composition may contain silica. The fluoroelastomer composition contains silica, whereby the fluoroelastomer layer and the polymer layer are adhered more firmly. As the silica, basic silica and acidic silica can be used, and from the viewpoint of adhesiveness, basic silica is preferably used. Examples of the basic silica include Carplex 1120 (manufactured by DSL Japan Co., Ltd.), Sidistar R300 (manufactured by Elkem Corporation), Silene732D (manufactured by PPG Industries), and Inhibisil75 (manufactured by PPG Industries). Further, since the fluoroelastomer layer and the polymer layer adhere more firmly, silica having a large average particle size is preferably used. Examples of silica having a large average particle size include Sidistar R300 (manufactured by Elkem Corporation), Sidistar T120U (manufactured by Elkem Corporation), ADMAFINE series (manufactured by Admatechs), and Excelica series (manufactured by Tokuyama Corporation).

The content of the silica in the fluoroelastomer composition is preferably, based on 100 parts by mass of the fluoroelastomer, 5 to 100 parts by mass, more preferably 10 to 70 parts by mass, still more preferably 15 to 50 parts by mass, and most preferably 15 to 30 parts by mass, since the fluoroelastomer layer and the polymer layer adhere more firmly to each other.

[Other Components]

Since the fluoroelastomer layer and polymer layer adhere more firmly to each other, the fluoroelastomer composition preferably further contains a crosslinking agent. As the crosslinking agent, a peroxide crosslinking agent or the like can be selected according to the purpose. The fluoroelastomer composition preferably contains a peroxide crosslinking agent.

Examples of the peroxide crosslinking agent include, but are not limited to, organic peroxides. The organic peroxides are preferably those which easily generate peroxy radicals in the presence of heat or a redox system, and examples thereof include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(benzoylperoxy)hexane, t-butylperoxymaleic acid, and t-butylperoxy isopropyl carbonate. More preferred are dialkyl compounds.

The amount of peroxide crosslinking agent used is usually selected as appropriate in accordance with factors such as the amount of active —O—O— and the decomposition temperature. The content of the peroxide crosslinking agent in the fluoroelastomer composition is usually 0.1 to 15 parts by mass, preferably 0.3 to 5 parts by mass, more preferably 1 to 4 parts by mass, and still more preferably 1 to 2 parts by mass, based on 100 parts by mass of the fluoroelastomer.

When the crosslinking agent is an organic peroxide, the fluoroelastomer composition preferably contains a crosslinking aid. Examples of the crosslinking aid include triallyl cyanurate, trimethallyl isocyanurate, triallyl isocyanurate (TRIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyl trisiloxane, tri(5-norbornene-2-methylene)cyanurate, and triallyl phosphite. In order to achieve good crosslinkability and good physical properties of the resulting crosslinked product, triallyl isocyanurate (TAIC) is preferred.

The content of the crosslinking aid in the fluoroelastomer composition is preferably 0.2 to 10 parts by mass, more preferably 0.5 to 9 parts by mass, still more preferably 2 to 8 parts by mass, and most preferably 3 to 7 parts by mass, based on 100 parts by mass of the fluoroelastomer.

The fluoroelastomer composition may further contain, as an acid acceptor or a compounding agent for improving the adhesion between the fluoroelastomer layer and the polymer layer, at least one compound selected from the group consisting of a metal oxide, a metal hydroxide, a weak acid salt of alkali metal, and a weak acid salt of alkaline earth metal.

Examples of the metal oxide, metal hydroxide, weak acid salt of alkali metal, and weak acid salt of alkaline earth metal include: oxides, hydroxides, carbonates, carboxylates, silicates, borates, and phosphites of metals in the group (II) of the periodic table; and oxides, basic carbonates, basic carboxylates, basic phosphites, and basic sulfites of metals in the group (IV) of the periodic table.

Specific examples of the metal oxide, metal hydroxide, weak acid salt of alkali metal, and weak acid salt of alkaline earth metal include magnesium oxide, zinc oxide, magnesium hydroxide, barium hydroxide, magnesium carbonate, barium carbonate, calcium oxide (quicklime), calcium hydroxide (slaked lime), calcium carbonate, calcium silicate, calcium stearate, zinc stearate, calcium phthalate, calcium phosphite, tin oxide, and basic tin phosphite.

In the case of using the organic peroxide as the crosslinking agent, the content of the metal oxide, metal hydroxide, weak acid salt of alkali metal, and weak acid salt of alkaline earth metal is preferably 5 parts by mass or less, more preferably 3 parts by mass or less and still more preferably not contained from the viewpoint of acid resistance.

The fluoroelastomer composition may contain common additives to be blended into fluoroelastomer compositions as appropriate, and examples thereof include various additives such as a filler, processing aid, plasticizer, colorant, stabilizer, adhesive aid, acid acceptor, mold release agent, conductivity-imparting agent, thermal-conductivity-imparting agent, surface non-adhesive agent, flexibility-imparting agent, heat resistance improver, and flame retarder. One or more of common crosslinking agents and crosslinking accelerators other than those mentioned above may also be contained.

Examples of the filler include carbon black. The content of carbon black is preferably 0 to 100 parts by mass, more preferably 2 to 60 parts by mass, still more preferably 5 to 40 parts by mass, and particularly preferably 10 to 30 parts by mass, based on 100 parts by mass of the fluoroelastomer. The use of carbon black has an advantage of improving mechanical properties, heat resistance, and the like.

The fluoroelastomer composition can be obtained by kneading each component using a commonly used rubber kneading device. Examples of the rubber kneading device include rolls, kneaders, Banbury mixers, internal mixers, and twin-screw extruders.

(B) Polymer Layer

The polymer layer is a layer different from the fluoroelastomer layer and is a layer formed from a polymer (excluding fluoroelastomer).

The polymer forming the polymer layer may be a resin or a rubber (excluding fluoroelastomer), but is preferably a resin.

Examples of rubber include diene-based rubber such as acrylonitrile-butadiene rubber (NBR) and hydride thereof (HNBR), styrene-butadiene rubber (SBR), chloroprene rubber (CR), butadiene rubber (BR), natural rubber (NR), and isoprene rubber (IR), ethylene-propylene-termonomer copolymerized rubber, silicone rubber, butyl rubber, epichlorohydrin rubber, acrylic rubber, chlorinated polyethylene (CPE), polyblend of acrylonitrile-butadiene rubber and vinyl chloride (PVC-NBR), ethylene propylene diene rubber (EPDM), and chlorosulfonated polyethylene (CSM).

Examples of the resins include fluororesins, polyamide type resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), polyetherimide resins, resins composed of ethylene/vinyl alcohol copolymers, polyphenylene sulfide resins, polybutylene naphthalate resins, polybutylene terephthalate resins, and polyphthalamide (PPA).

The polymer forming the polymer layer is preferably a fluororesin because of its excellent chemical resistance and low fuel permeability.

The fluororesin preferably has a low fuel permeability coefficient. The fuel permeability coefficient of the fluororesin is preferably 2.0 g·mm/m$^2$/day or less, more preferably 1.5 g·mm/m$^2$/day or less, still more preferably 0.8 g·mm/m$^2$/day or less, particularly preferably 0.55 g·mm/m$^2$/day or less, and most preferably 0.5 g·mm/m$^2$/day or less. Since the polymer layer contains a fluororesin having a fuel permeability coefficient within the above range, the polymer layer exhibits excellent low fuel permeability, and the laminate can be suitably used as a fuel hose or the like.

The fuel permeability coefficient is a value calculated from the mass change determined as follows. Specifically, a SUS316 fuel permeability coefficient measurement cup having an inner diameter of 40 mmϕ and a height of 20 mm is charged with 18 mL of an isooctane-toluene-ethanol solvent mixture in which isooctane, toluene, and ethanol are mixed at a ratio by volume of 45:45:10; a fluororesin sheet (diameter: 45 mm, thickness: 120 μm) is produced from the measurement target resin by the following method and is put into the measurement cup; and then the mass change is determined at 60° C.

(Method for Producing Fluororesin Sheet)

Resin pellets are put into a mold having a diameter of 120 mm. The workpiece is mounted on a press heated up to 300° C. and the pellets are melt-pressed at a pressure of about 2.9 MPa, whereby a fluororesin sheet having a thickness of 0.12 mm is obtained. This sheet is then processed to have a diameter of 45 mm and a thickness of 120 μm.

In order to provide a laminate having excellently low fuel permeability, the fluororesin is preferably at least one selected from the group consisting of polychlorotrifluoroethylene (PCTFE), a CTFE copolymer, and a TFE/HFP/VdF copolymer, more preferably at least one selected from the group consisting of polychlorotrifluoroethylene (PCTFE) and a CTFE copolymer, and from the viewpoint of low fuel permeability and good flexibility, a CTFE copolymer is still more preferred.

A lower VdF content leads to lower fuel permeability, and thus the TFE/HFP/VdF copolymer preferably satisfies a TFE/HFP/VdF copolymerization ratio (mol % ratio) of 75 to 95/0.1 to 10/0.1 to 19, more preferably 77 to 95/1 to 8/1 to 17 (molar ratio), still more preferably 77 to 95/2 to 8/2 to 15.5 (molar ratio), most preferably 79 to 90/5 to 8/5 to 15 (molar ratio). The TFE/HFP/VdF copolymer may contain 0 to 20 mol % of a different monomer. The different monomer may be at least one monomer selected from the group consisting of fluorine-containing monomers such as perfluoro(methyl vinyl ether), perfluoro(ethyl vinyl ether), perfluoro(propyl vinyl ether), chlorotrifluoroethylene, 2-chloropentafluoropropene, perfluorinated vinyl ether (e.g., perfluoroalkoxy vinyl ethers such as $CF_3OCF_2CF_2OCF_2OCF=CF_2$) perfluoroalkyl vinyl ether, perfluoro-1,3-butadiene, trifluoroethylene, hexafluoroisobutene, vinyl fluoride, ethylene, propylene, and alkyl vinyl ether. Preferred are perfluoro(methyl vinyl ether), perfluoro(ethyl vinyl ether), and perfluoro(propyl vinyl ether).

PCTFE is a homopolymer of chlorotrifluoroethylene.

The CTFE copolymer preferably contains a copolymerized unit (CTFE unit) derived from CTFE and a copolymerized unit derived from at least one monomer selected from the group consisting of TFE, HFP, PAVE, VdF, vinyl fluoride, hexafluoroisobutene, monomers represented by the formula: $CH_2=CX^3(CF_2)_nX^4$ (wherein $X^3$ is H or F; $X^4$ is H, F, or Cl; and n is an integer of 1 to 10), ethylene, propylene, 1-butene, 2-butene, vinyl chloride, and vinylidene chloride. The CTFE copolymer is more preferably a perhalopolymer.

The CTFE copolymer more preferably contains a CTFE unit and a copolymerized unit derived from at least one monomer selected from the group consisting of TFE, HFP, and PAVE, still more preferably consists substantially only of these copolymerized units. From the viewpoint of low fuel permeability, the CTFE copolymer is preferably free from a monomer containing a CH bond, such as ethylene, vinylidene fluoride, and vinyl fluoride.

A perhalopolymer free from a monomer having a CH bond is usually difficult to adhere to a fluoroelastomer, but according to the configuration of the present disclosure, even when the polymer layer contains a perhalopolymer, interlayer adhesion between the fluoroelastomer layer and the polymer layer is strong.

The CTFE-based copolymer preferably has 10 to 90 mol % of CTFE units based on the total monomer units.

The CTFE copolymer particularly preferably contains a CTFE unit, a TFE unit, and a monomer (a) unit derived from a monomer (a) copolymerizable therewith.

The "CTFE unit" and the "TFE unit" are respectively a moiety ($-CFCl-CF_2-$) derived from CTFE and a moiety ($-CF_2-CF_2-$) derived from TFE in the molecular structure of the CTFE copolymer, and the "monomer (a) unit" is similarly a moiety formed by addition of a monomer (a) in the molecular structure of the CTFE copolymer.

The monomer (a) may be any monomer copolymerizable with CTFE and TFE. Examples thereof include ethylene (Et), vinylidene fluoride (VdF), PAVE represented by $CF_2=CF-ORf^2$ (wherein $Rf^2$ is a perfluoroalkyl group having 1 to 8 carbon atoms), vinyl monomers represented by $CX^5X^6=CX^7(CF_2)_nX^8$ (wherein $X^5$, $X^6$, and $X^7$ are the same as or different from each other, and are each a hydrogen atom or a fluorine atom; $X^8$ is a hydrogen atom, a fluorine atom, or a chlorine atom; and n is an integer of 1 to 10), and alkyl perfluorovinyl ether derivatives represented by $CF_2=CF-O-Rf^3$ (wherein $Rf^3$ is a perfluoroalkyl group having 1 to 5 carbon atoms).

Preferred among the alkyl perfluorovinyl ether derivatives are those in which $Rf^3$ is a perfluoroalkyl group having 1 to 3 carbon atoms, and more preferred is $CF_2=CF-OCF_2-CF_2CF_3$.

The monomer (a) is preferably at least one selected from the group consisting of PAVE, the vinyl monomers, and the alkyl perfluorovinyl ether derivatives, more preferably at least one selected from the group consisting of PAVE and HFP, particularly preferably PAVE.

For the ratio of the CTFE unit and the TFE unit in the CTFE copolymer, the CTFE unit represents 15 to 90 mol % and the TFE unit represents 85 to 10 mol %, more preferably the CTFE unit represents 20 to 90 mol % and the TFE unit represents 80 to 10 mol %. Also preferred is a structure in which the CTFE unit represents 15 to 25 mol % and the TFE unit represents 85 to 75 mol %.

The CTFE copolymer preferably satisfies that the CTFE unit and the TFE unit represent 90 to 99.9 mol % in total and the monomer (a) unit represents 0.1 to 10 mol %. Less than 0.1 mol % of the monomer (a) unit may cause poor moldability, environmental stress cracking resistance, and fuel crack resistance. More than 10 mol % thereof tends to cause insufficiently low fuel permeability, poor heat resistance, and poor mechanical properties.

From the viewpoint of low fuel permeability and adhesiveness, the fluororesin is more preferably at least one selected from the group consisting of PCTFE, CTFE/TFE/PAVE copolymers and TFE/HFP/VdF copolymers, still more preferably at least one selected from the group consisting of CTFE/TFE/PAVE copolymers and TFE/HFP/VdF copolymers, and particularly preferably CTFE/TFE/PAVE copolymers.

The CTFE/TFE/PAVE copolymer is a copolymer consisting substantially only of CTFE, TFE and PAVE.

Examples of the PAVE in the CTFE/TFE/PAVE copolymer include perfluoro(methyl vinyl ether) (PMVE), perfluoro(ethyl vinyl ether) (PEVE), perfluoro (propyl vinyl ether) (PPVE), and perfluoro (butyl vinyl ether). Preferred among these is at least one selected from the group consisting of PMVE, PEVE, and PPVE.

In the CTFE/TFE/PAVE copolymer, the PAVE unit preferably represents 0.5 mol % or more and 5 mol % or less of all monomer units.

The constituent units such as a CTFE unit are values obtainable by $^{19}$F-NMR analysis.

The fluororesin may contain at least one reactive functional group selected from the group consisting of a carbonyl group, a hydroxyl group, a heterocyclic group, and an amino group introduced into a side chain and/or an end of the main chain of the polymer.

The term "carbonyl group" as used herein means a divalent carbon group containing a carbon-oxygen double bond, which is typified by $-C(=O)-$. Examples of the reactive functional group containing a carbonyl group include, but are not limited to, those containing a carbonyl group as a moiety of the chemical structure, such as a carbonate group, a carboxylic acid halide group (halogenoformyl group), a formyl group, a carboxyl group, an ester bond ($-C(=O)O-$), an acid anhydride bond ($-C(=O)O-C(=O)-$), an isocyanate group, an amide group, an imide group ($-C(=O)-NH-C(=O)-$), a urethane bond ($-NH-C(=O)O-$), a carbamoyl group ($NH_2-C(=O)-$), a carbamoyloxy group ($NH_2-C(=O)O-$), a ureido group ($NH_2-C(=O)-NH-$), and an oxamoyl group ($NH_2-C(=O)-C(=O)-$).

In groups such as an amide group, an imide group, a urethane bond, a carbamoyl group, a carbamoyloxy group, a ureido group, and an oxamoyl group, a hydrogen atom binding to the nitrogen atom thereof may be replaced by a hydrocarbon group such as an alkyl group.

In order to achieve easy introduction and to allow the fluororesin to have moderate heat resistance and good adhesion at relatively low temperatures, the reactive functional group is preferably an amide group, a carbamoyl group, a hydroxyl group, a carboxyl group, a carbonate group, a carboxylic acid halide group, or an acid anhydride bond, more preferably an amide group, a carbamoyl group, a hydroxyl group, a carbonate group, a carboxylic acid halide group, or an acid anhydride bond.

The fluororesin may be obtainable by any conventionally known polymerization method such as suspension polymerization, solution polymerization, emulsion polymerization, or bulk polymerization. In the polymerization, the conditions such as the temperature and the pressure, a polymerization initiator and other additives may appropriately be selected in accordance with the compositional feature and amount of the fluororesin (b1).

The fluororesin preferably has a melting point of 160° C. to 270° C., although not limited thereto. The melting point of the fluororesin is defined as the temperature corresponding to the maximum value on a heat-of-fusion curve obtained by increasing the temperature at a rate of 10° C./min using a DSC device (manufactured by Seiko Instruments Inc.).

The fluororesin preferably has a molecular weight that allows the resulting laminate to exert characteristics such as good mechanical properties and low fuel permeability. For example, with the melt flow rate (MFR) taken as an indicator of the molecular weight, the MFR is preferably 0.5 to 100 g/10 min at any temperature within the range of about 230° C. to 350° C., which is a common molding temperature range for fluororesins. The MFR is more preferably 1 to 50 g/10 min, still more preferably 2 to 35 g/10 min. For example, for the fluororesin that is PCTFE, a CTFE copolymer, or a TFE/HFP/VdF copolymer, the MFR is measured at 297° C.

The MFR can be determined by measuring the weight (g) of the polymer flowed out of a nozzle (diameter: 2 mm, length: 8 mm) per unit time (10 minutes) at 297° C. under a load of 5 kg using a melt indexer (manufactured by Toyo Seiki Seisaku-sho, Ltd.).

The polymer layer may contain one of these fluororesins, or may contain two or more of these fluororesins.

The fluororesin can lead to better chemical resistance and lower fuel permeability when it is a perhalopolymer. The perhalopolymer is a polymer in which every carbon atom constituting the main chain of the polymer is coupled with a halogen atom.

The polymer layer may further contain any of various fillers such as inorganic powder, glass fiber, carbon powder, carbon fiber, and metal oxides in accordance with the purpose and application thereof to the extent that does not impair the performance thereof.

For example, in order to further reduce fuel permeability, a smectite-based layered viscosity mineral such as montmorillonite, biderite, saponite, nontronite, hectorite, sauconite, stevensite, or a microlayered mineral having a high aspect ratio such as mica may be added.

In order to impart conductivity, a conductive filler may be added. Examples of the conductive filler include, but are not limited to, powder or fiber of conductive simple substance such as metal or carbon; powder of a conductive compound such as zinc oxide; and powder whose surface has undergone conductivity-imparting treatment. In the case of adding a conductive filler, the filler is preferably melt-kneaded into pellets in advance.

Examples of the powder or fiber of conductive simple substance include, but are not limited to, powder of metal such as copper or nickel; fiber of metal such as iron or stainless steel; and carbon black, carbon fiber, and carbon fibril disclosed in Japanese Patent Laid-Open No. 3-174018.

The powder whose surface has undergone conductivity-imparting treatment is powder obtainable by subjecting the surface of non-conductive powder such as glass beads or titanium oxide to conductivity-imparting treatment.

Examples of the conductivity-imparting treatment on the surface include, but are not limited to, metal sputtering and electroless plating.

Carbon black is suitably used among the above conductive fillers from the viewpoint of economic efficiency and prevention of storage of static electricity.

The fluororesin composition containing a conductive filler preferably has a volume resistivity of $1\times10^0$ to $1\times10^9$ Ω·cm. The lower limit thereof is more preferably $1\times10^2$ Ω·cm, while the upper limit thereof is more preferably $1\times10^8$ Ω·cm.

In addition to the filler, any other appropriate additives such as a thermal stabilizer, a reinforcing agent, an ultraviolet absorber, and a pigment may be added.

(Laminated Body)

The thickness of the fluoroelastomer layer is not limited, but is preferably 100 μm or more, for example. The upper limit of the thickness of the fluoroelastomer layer is, for example, 5000 μm.

The thickness of the polymer layer is not limited, but is preferably 10 μm or more, for example. The upper limit of the thickness of the polymer layer is, for example, 1000 μm.

The adhesive strength between the fluoroelastomer layer and the polymer layer in the laminate is preferably 7 N/cm or more, more preferably 11 N/cm or more, still more preferably 12 N/cm or more, and particularly preferably 15 N/cm or more. When the adhesive strength is within the above range, there are advantages that displacement is less likely to occur when the hose is crosslinked in a specific shape and peeling does not occur when impact is applied. The laminate of the present disclosure having the above-described configuration can have an adhesive strength within the above-described range.

The adhesive strength is determined as follows. The laminate is cut into three strips having a width of 10 mm and a length of 40 mm, whereby test pieces are prepared. For each of these test pieces, in order to determine the adhesive strength of the adhesion surface alone without the adhesive strength of the interface between the fluoroelastomer layer and the polymer layer, the interface between the fluoroelastomer layer and the polymer layer is slowly stretched by hand once to increase the grip section by 2 to 3 mm. Then, the test piece is subjected to a peeling test at 25° C. and a tensile rate of 50 mm/min using an autograph (AGS-J 5 kN, manufactured by Shimadzu Corporation) in conformity with JIS K 6256 (Determination of adhesion strength for vulcanized rubber). The mode of peeling is then observed. The value thereby obtained is defined as the adhesive strength.

In the laminate of the present disclosure, the fluoroelastomer layer and the polymer layer are preferably directly adhered to each other, and more preferably directly crosslinked and adhered to each other. Such a laminate can be obtained by laminating an uncrosslinked fluoroelastomer layer and a polymer layer and then subjecting them to crosslinking treatment. The laminate of the present disclosure may be a crosslinked laminate.

The crosslinking treatment can be performed by a conventionally known crosslinking method under conventionally known crosslinking conditions for fluoroelastomer compositions. Examples thereof include a method of crosslinking an uncrosslinked laminate for a long time, and a method of heating an uncrosslinked laminate for a relatively short time as a pretreatment (crosslinking also occurs), and then crosslinking the workpiece for a long time. Preferred between them is a method of heating an uncrosslinked laminate for a relatively short time as a pretreatment, and then crosslinking the workpiece for a long time. This is because the pretreatment can easily lead to adhesion between the fluoroelastomer layer and the polymer layer and the pretreatment allows the fluoroelastomer layer to be crosslinked already and to have a stable shape, which can provide various choices of a method of holding the laminate during the following crosslinking.

The crosslinking treatment may be performed under any usual conditions. Preferably, the crosslinking is performed at 140° C. to 180° C. for 2 to 80 minutes using steam, press, oven, air bath, infrared radiation, microwaves, lead-covered crosslinking, or the like. The crosslinking is more preferably performed at 150° C. to 17000 for 5 to 60 minutes. The crosslinking treatment may be divided into a first crosslinking and a second crosslinking.

The laminate of the present disclosure can be suitably produced by a method for producing a laminate including, for example, a step of mixing a fluoroelastomer, a basic polyfunctional compound, and polytetrafluoroethylene to obtain a fluoroelastomer composition, a step of laminating an uncrosslinked fluoroelastomer layer obtained by molding the fluoroelastomer composition and a polymer layer, and a step of performing a crosslinking treatment on the laminated uncrosslinked fluoroelastomer layer and polymer layer. In the above production method, the conditions of the crosslinking treatment are the same as those described above.

The mixing of the fluoroelastomer, the basic polyfunctional compound, and the polytetrafluoroethylene can be performed, for example, by kneading the fluoroelastomer, the basic polyfunctional compound, and the polytetrafluoroethylene using a commonly used rubber kneading device.

Examples of the rubber kneading device include rolls, kneaders, Banbury mixers, internal mixers, and twin-screw extruders.

In the mixing, in addition to the fluoroelastomer, the basic polyfunctional compound, and the polytetrafluoroethylene, if necessary, other additives such as a crosslinking agent, a crosslinking aid, a co-crosslinking agent, a crosslinking accelerator, and a filler may be mixed.

The mixing temperature is, for example, 20 to 20000. The mixing time is, for example, 2 to 80 minutes.

The uncrosslinked fluoroelastomer layer and the polymer layer may be laminated by any of a method in which the uncrosslinked fluoroelastomer layer and the polymer layer are separately molded and then laminated by means of pressure bonding or the like, a method in which the uncrosslinked fluoroelastomer layer and the polymer layer are simultaneously molded and laminated, and a method in which the polymer is applied to the uncrosslinked fluoroelastomer layer to form the polymer layer.

In the method in which the uncrosslinked fluoroelastomer layer and the polymer layer are separately molded and then laminated by means of compression or the like, a method for molding the fluoroelastomer composition alone and a method for molding the polymer alone may be adopted.

For the molding of the uncrosslinked fluoroelastomer layer, the molded article having any shape such as a sheet or a tube may be produced by using heat compression molding, transfer molding, extrusion molding, injection molding, calender molding, or coating of the fluoroelastomer composition. The molding may be performed using any molding device usually used for polymers, such as an injection molding device, a blow molding device, an extrusion molding device, or any coating device. They can provide a laminate having any shape such as a sheet or a tube. In order to achieve excellent productivity, extrusion molding is preferred.

For the molding of the polymer layer, the molded article having any shape such as a sheet or a tube may be produced by using compression molding, extrusion molding, injection molding, calender molding, or coating (including powder coating). The molding may be performed using any molding device usually used for polymers, such as an injection molding device, a blow molding device, an extrusion molding device, or any coating device. They can provide a laminate having any shape such as a sheet or a tube. In order to achieve excellent productivity, extrusion molding is preferred.

The method in which the uncrosslinked fluoroelastomer layer and the polymer layer are molded and laminated simultaneously may be a method in which a fluoroelastomer composition to form the uncrosslinked fluoroelastomer layer and a polymer to form the polymer layer are molded and laminated simultaneously by a technique such as multilayer compression molding, multilayer transfer molding, multilayer extrusion molding, multilayer injection molding, or doubling. This method enables simultaneous laminating of the uncrosslinked fluoroelastomer layer which is an uncrosslinked molded body and the polymer layer. Thus, the method needs no step of closely adhering the uncrosslinked fluoroelastomer layer and the polymer layer and is suitable to achieve firm adhesion in the following crosslinking. If the close adhesion is insufficient, a close-adhesion step such as wrapping may be performed. In order to achieve excellent productivity, multilayer extrusion molding is preferred.

(Layer Structure of Laminate)

The laminate of the present disclosure includes the above-mentioned fluoroelastomer layer (hereinafter, may be referred to as a fluoroelastomer layer (A)) and the above-mentioned polymer layer (hereinafter, may be referred to as a polymer layer (B)).

The laminate of the present disclosure may have a bilayer structure of the fluoroelastomer layer (A) and the polymer layer (B), may have a structure in which the fluoroelastomer layer (A) is laminated on each side of the fluororesin polymer (B), or may have a structure in which the polymer layer (B) is laminated on each side of the fluoroelastomer layer (A).

For example, the laminated product may have a trilayer structure of fluoroelastomer layer (A)-polymer layer (B)-fluoroelastomer layer (A) or of polymer layer (B)-fluoroelastomer layer (A)-polymer layer (B).

The laminated product may have a multilayer structure of three or more layers including a polymer layer (C) other than the fluoroelastomer layer (A) and the polymer layer (B) bonded together, or may be a structure including a polymer layer (D) on one or each side of a trilayer structure including a polymer layer (C) other than the fluoroelastomer layer (A) and the polymer layer (B) adhered together. The polymer layer (C) and the polymer layer (D) may be the same as or different from each other.

The laminate of the present disclosure may include a polymer layer (C) on one or each side of a trilayer structure of fluoroelastomer layer (A)-polymer layer (B)-fluoroelastomer layer (A).

The polymer layers (C) and (D) may be respectively rubber layers (C1) or (D1) other than the fluoroelastomer layer (A). The rubber layers (C1) and (D1) may be respectively non-fluoroelastomer layers (C1a) or (D1a) formed from a non-fluoroelastomer. A non-fluoroelastomer is preferred because it has good low-temperature resistance and excellent cost efficiency. The non-fluoroelastomer layer (C1a) and the non-fluoroelastomer layer (D1a) may be formed from the same non-fluoroelastomer, or may be formed from different non-fluoroelastomers.

The laminate of the present disclosure may include the layers laminated in the order of fluoroelastomer layer (A)-polymer layer (B)-non-fluoroelastomer layer (C1a).

The laminate of the present disclosure may further include a non-fluoroelastomer layer (D1a) and the layers may be laminated in the order of non-fluoroelastomer layer (D1a)-fluoroelastomer layer (A)-polymer layer (B)-non-fluoroelastomer layer (C1a), in the order of fluoroelastomer layer (A)-polymer layer (B)-non-fluoroelastomer layer (D1a)-non-fluoroelastomer layer (C1a), or in the order of fluoroelastomer layer (A)-polymer layer (B)-non-fluoroelastomer layer (C1a)-non-fluoroelastomer layer (D1a).

Specific examples of the non-fluoroelastomer include diene-based rubber such as acrylonitrile-butadiene rubber (NBR) or hydride thereof (HNBR), styrene-butadiene rubber (SBR), chloroprene rubber (CR), butadiene rubber (BR), natural rubber (NR), and isoprene rubber (IR), ethylene-propylene-termonomer copolymerized rubber, silicone rubber, butyl rubber, epichlorohydrin rubber, acrylic rubber, chlorinated polyethylene (CPE), polyblend of acrylonitrile-butadiene rubber and vinyl chloride (PVC-NBR), ethylene propylene diene rubber (EPDM), and chlorosulfonated polyethylene (CSM). Examples also include rubber obtained by mixing any of these non-fluoroelastomers and fluoroelastomers at any proportion.

In order to achieve good heat resistance, oil resistance, weather resistance, and extrusion moldability, the non-fluoroelastomer is preferably a diene-based rubber or epichlorohydrin rubber. It is more preferably NBR, HNBR, or epichlorohydrin rubber. The rubber layer (C1) is preferably formed from NBR, HNBR, or epichlorohydrin rubber.

In order to achieve good weather resistance and cost efficiency, the rubber layer (D1) is preferably formed from acrylonitrile-butadiene rubber, epichlorohydrin rubber, chlorinated polyethylene (CPE), polyblend of acrylonitrile-butadiene rubber and vinyl chloride (PVC-NBR), ethylene propylene diene rubber (EPDM), acrylic rubber, or a mixture of any of these. The uncrosslinked rubber composition to form the rubber layer (C1) or (D1) may also contain a crosslinking agent and any other compounding agents.

Next, the layer structure of the laminate of the present disclosure is described in more detail below.

(1) Bilayer Structure of Fluoroelastomer Layer (a)-Polymer Layer (b)

This is a basic structure. Conventional structures of this type suffer insufficient bonding between the layers (between the fluoroelastomer layer and the fluororesin layer), and thus stacking of the polymer layer (B) and the fluoroelastomer layer (A) requires surface treatment on the resin side, application of additional adhesive between the layers, fixing of the layers by wrapping a tape-shaped film therearound, or the like, which causes complication of the process. In the present disclosure, crosslinking leads to crosslink bonding, so that chemically firm adhesion between the layers can be achieved without such a complicated process.

(2) Trilayer Structure of Rubber Layer-Polymer Layer (b)-Rubber Layer

Examples of this structure include a trilayer structure of fluoroelastomer layer (A)-polymer layer (B)-fluoroelastomer layer (A) and a trilayer structure of fluoroelastomer layer (A)-polymer layer (B)-rubber layer (C1).

In the case of the sealability is required, such as joint portions of fuel pipes, the rubber layer is preferably provided on each side of the rubber layer so as to secure the sealability. The inner and outer rubber layers may be the same as or different from each other.

In the case of a trilayer structure of fluoroelastomer layer (A)-polymer layer (B)-rubber layer (C1), the rubber layer (C1) is preferably a layer formed from acrylonitrile butadiene rubber, hydrogenated acrylonitrile butadiene rubber, epichlorohydrin rubber, or a mixture of acrylonitrile butadiene rubber and acrylic rubber.

In order to improve the chemical resistance and the low fuel permeability, a fuel pipe may have a trilayer structure of fluoroelastomer layer (A)-polymer layer (B)-rubber layer (C1) in which a fluoroelastomer layer is disposed as the rubber layer (C1) and the rubber layer (C1) is disposed as an inner layer of the pipe.

(3) Trilayer Structure of Resin Layer-Fluoroelastomer Layer (A)-Resin Layer

An example of this structure is a trilayer structure of polymer layer (B)-fluoroelastomer layer (A)-polymer layer (B). The inner and outer resin layers may be the same as or different from each other.

(4) Trilayer Structure of Polymer Layer (B)-Fluoroelastomer Layer (A)-Rubber Layer (C1)

(5) Structure Including Four or More Layers

In accordance with the purpose, any of the fluoroelastomer layer (A), the rubber layer (C1), and the polymer layer (B) may be laminated on any of the trilayer structures (2) to (4). Another layer such as metal foil may be disposed, and an adhesive layer may be disposed between the layers excluding between the fluoroelastomer layer (A) and the polymer layer (B).

Further, the polymer layer (C) may be laminated to provide a lined article.

The parameters such as thicknesses and shapes of the respective layers may be appropriately selected in accordance with the purpose and form of use, for example.

Further, for the purpose of improving the pressure resistance, a reinforcing layer such as a reinforcing thread may be appropriately provided.

The present disclosure also relates to an extruded article containing fluoroelastomer and PTFE, in which PTFE is dispersed in the extruded article in the state of single particles.

In extrusion, since the shape of the fluoroelastomer is not controlled using a mold, when a conventional fluoroelastomer composition containing a fluoroelastomer and PTFE is molded by extrusion molding and the resulting extrudate is crosslinked, the extrudate shrinks during crosslinking, and an extruded article having a desired shape may not be obtained.

In the extruded article of the present disclosure, PTFE is dispersed in the state of single particles in the extruded article, and the shrinkage of the extruded article when the fluoroelastomer is crosslinked can thus be suppressed. The extruded article of the present disclosure may be a crosslinked extruded article.

The present disclosure also relates to an extruded article containing fluoroelastomer and PTFE, in which PTFE has a specific surface area of less than 8 $m^2/g$.

In the extruded article of the present disclosure, PTFE has a specific surface area of less than 8 $m^2/g$, and the shrinkage of the extruded article when the fluoroelastomer is crosslinked can thus be suppressed. The extruded article of the present disclosure may be a crosslinked extruded article.

Suitable configurations of the fluoroelastomer and the PTFE contained in the extruded article of the present disclosure are the same as those of the fluoroelastomer forming the fluoroelastomer layer and PTFE included in the laminate of the present disclosure.

The content of PTFE in the extruded article is preferably, based on 100 parts by mass of the fluoroelastomer, 0.5 to 100 parts by mass, more preferably 10 parts by mass or more, still more preferably 20 parts by mass or more, more preferably 80 parts by mass or less, still more preferably 60 parts by mass or less, and particularly preferably 45 parts by mass or less.

It is also preferable that the extruded article of the present disclosure is formed from a fluoroelastomer composition containing a fluoroelastomer, PTFE and a basic polyfunctional compound. Suitable configurations of the fluoroelastomer composition forming the extruded article are the same as those of the fluoroelastomer composition forming the fluoroelastomer layer included in the laminate of the present disclosure.

The extruded article of the present disclosure can be used by laminating it with a polymer (excluding fluoroelastomer). The present disclosure also relates to an extruded laminate comprising a fluoroelastomer layer formed from the extruded article and a polymer layer.

The extruded article of the present disclosure can be strongly adhered to an extruded article and is less likely to shrink when the fluoroelastomer is crosslinked. Therefore, the extruded laminate of the present disclosure can be suitably produced with high productivity by obtaining an uncrosslinked laminate including an uncrosslinked fluoroelastomer layer (extrusion molded article) and a polymer layer by a multilayer extrusion molding in which a fluoroelastomer composition containing a fluoroelastomer and PTFE and a polymer are coextruded, and then subjecting the uncrosslinked laminate to a crosslinking treatment. Even when the uncrosslinked laminate is subjected to a crosslinking treatment, the fluoroelastomer layer is less likely to shrink and the shape of the fluoroelastomer layer and the polymer layer is less likely to deviate from each other. For this reason, the extruded laminate of the present disclosure is also preferably a coextruded laminate (coextruded crosslinked laminate).

The laminate and extruded article of the present disclosure have excellently low fuel permeability, as well as excellent heat resistance, oil resistance, fuel oil resistance, LLC resistance, steam resistance, weather resistance, and ozone resistance, so that the laminate of the present disclosure is sufficiently tolerant of use under severe conditions, and thus can be used in a variety of applications.

For example, the laminate has properties suitable for seals such as gaskets, non-contact or contact packings (e.g., self-seal packings, piston rings, split ring packings, mechanical seals, and oil seals), bellows, diaphragms, hoses, tubes, and electric wires, which are required to have heat resistance, oil resistance, fuel oil resistance, antifreeze resistance, and steam resistance, of engine bodies, main drive systems, valve train systems, lubrication and cooling systems, fuel systems, and intake and exhaust systems of automobile engines, transmission systems of driveline systems, steering systems and braking systems of chassis, and basic electrical parts of electrical equipment, electrical parts of control systems, and electrical equipment accessories.

Specifically, the laminate can be used in the following applications:

gaskets such as cylinder head gaskets, cylinder head cover gaskets, sump packings, and general gaskets, seals such as O-rings, packings, and timing belt cover gaskets, and hoses such as control hoses, of engine bodies, antivibration rubber of engine mounts, and sealants for high-pressure valves in hydrogen storage systems;

shaft seals such as crankshaft seals and camshaft seals of main drive systems;

valve stem seals such as engine valves of valve train systems;

engine oil cooler hoses of engine oil coolers, oil return hoses, seal gaskets, water hoses used around radiators, and vacuum pump oil hoses of vacuum pumps, of lubrication and cooling systems;

oil seals, diaphragms, and valves of fuel pumps, fuel hoses such as filler (neck) hoses, fuel supply hoses, fuel return hoses, and vapor (evaporator) hoses, in-tank hoses, filler seals, tank packings, and in-tank fuel pump mounts of fuel tanks, tube bodies and connector O-rings of fuel pipe tubes, injector cushion rings, injector seal rings, injector O-rings, pressure regulator diaphragms, and check valves of fuel injection systems, needle valve petals, accelerator pump pistons, flange gaskets, and control hoses of carburetors, and valve seats and diaphragms of combined air controlling (CAC) systems in fuel systems; in particular, suitable for fuel hoses and in-tank hoses of fuel tanks;

intake manifold packings and exhaust manifold packings of manifolds, diaphragms, control hoses, and emission control hoses of exhaust gas recirculation (EGR) systems, diaphragms of BPT, after burn preventive valve seats of AB valves, throttle body packings of throttles, turbo oil hoses (supply), turbo oil hoses (return), turbo air hoses, intercooler hoses, and turbine shaft seals of turbochargers, of intake and exhaust systems;

transmission-related bearing seals, oil seals, O-rings, packings, and torque converter hoses, and mission oil hoses, ATF hoses, O-rings, and packings of ATs, of transmission systems;

power steering oil hoses of steering systems;

oil seals, O-rings, packings, brake oil hoses, air valves, vacuum valves, and diaphragms of master backs, piston cups (rubber cups) of master cylinders, caliper seals, and boots, of braking systems;

insulators and sheaths of electric wires (harnesses), and tubes of harness-holding parts of basic electrical parts;

cover materials for sensor lines of control system electrical parts; and

O-rings, packings, and air conditioner hoses of a car air conditioner of electrical equipment accessories, and wiper blades of exterior parts.

In addition to the field of automobiles, for example, the laminate of the present disclosure can be suitably used in the following applications: oil-resistant, chemical-resistant, heat-resistant, steam-resistant, or weather-resistant packings, O-rings, hoses, other sealants, diaphragms, and valves in a means of transportation, such as shipment and aircraft; similar packings, O-rings, sealants, diaphragms, valves, hoses, rolls, tubes, chemical-resistant coatings, and linings in chemical plants; hoses and gaskets in the chemical treatment field; similar packings, O-rings, hoses, sealants, belts, diaphragms, valves, rolls, and tubes in food plant equipment and food-related devices (including household utensils); similar packings, O-rings, hoses, sealants, diaphragms, valves, and tubes in nuclear power plant equipment; similar packings, O-rings, hoses, sealants, diaphragms, valves, rolls, tubes, linings, mandrels, electric wires, flexible joints, belts, rubber plates, and weather strips in QA equipment and general industrial parts; and roll blades of plain paper copiers. For example, back-up rubber materials of PTFE diaphragms are poor in lubricity, and thus are worn down or broken during use. In contrast, the laminate of the present disclosure can solve such problems, and thus is suitably used.

In application to food-related rubber sealants, conventional rubber sealants cause problems such as scent absorption and contamination of foods by rubber chips. In contrast, the laminate of the present disclosure can solve such problems, and thus is suitably used. In the case of medical and chemical applications, rubber materials used as sealants for pipes using rubber sealant solvents disadvantageously swell by such solvents. In contrast, the laminate of the present disclosure can solve such problems because the rubber is covered with resin. In general industrial fields, the laminate can be suitably used for rubber rolls, O-rings, packings, and sealants in order to improve the strength, lubricity, chemical resistance, and permeability of rubber materials. In particular, the laminate can be suitably used for packing of lithium ion batteries because the laminate maintains the chemical resistance and the sealability simultaneously. Further, the laminate can be suitably used in applications requiring slidability with low friction.

In the case of the medical applications, the laminate of the present disclosure can be suitably used in the following applications: drug closures, bottle cap seals, can seals, medicinal tapes, medicinal pads, syringe packings, bases for percutaneous absorption drugs, teats of baby bottles, medical bags, catheters, infusion sets, coinjection tubes, cap liners, caps of vacuum blood collection tubes, syringe gaskets, infusion tubes, gaskets and caps of medical equipment, syringe tips, grommets, caps of blood collection tubes, cap seals, packings, O-rings, sheath introducers, dilator, guiding sheaths, blood circuits, cardiopulmonary bypass circuits, tubes for rotablators, catheter needles, infusion sets, infusion tubes, closed catheter access system s, infusion bags, blood bags, blood component separation bags, tubes for blood component separation bags, artificial blood vessels, arterial cannulae, stents, protective tubes for endoscope treatment devices, scope tubes for endoscopes, top overtubes for endoscopes, guiding tubes for pharyngeal transit, tubes for coronary artery bypass graft surgery, ileus tubes, tubes for percutaneous transhepatic biliary drainage, outer tubes for electrosurgical knives, outer tubes for ultrasonic scalpels, outer tubes for dissecting forceps, and bags for cell culture.

Examples of the molded articles for offshore uses to which the laminate of the present disclosure may be applied include tubes or hoses for offshore oil fields (including injection tubes and crude oil transport tubes).

The laminate and extruded article of the present disclosure are particularly preferably used for tubes or hoses among these. In other words, the laminate and extruded article are preferably a tube or a hose. The laminate can suitably be used as a fuel pipe tube or hose of automobiles among the tubes or hoses owing to its heat resistance and low fuel permeability.

Tubes or hoses having a layer structure are preferably produced by a multilayer extrusion molding because it can be produced with high productivity. Even when the tube or hose of the present disclosure is produced by multilayer extrusion molding, shrinkage of the fluoroelastomer layer is less likely to occur when the fluoroelastomer is crosslinked, and sufficient adhesive strength between the fluoroelastomer layer and the polymer layer can be obtained.

Tubes or hoses having a single layer structure are also preferably produced by extrusion molding because it can be produced with high productivity. Even when the tube or hose of the present disclosure is produced by extrusion molding, shrinkage of the fluoroelastomer layer is less likely to occur when the fluoroelastomer is crosslinked.

Although the embodiments have been described above, it will be understood that various changes in form and details are possible without departing from the gist and scope of the claims.

According to the present disclosure, there is provided a laminate comprising a fluoroelastomer layer and a polymer layer, wherein the fluoroelastomer layer is formed of a fluoroelastomer composition containing a fluoroelastomer, a basic polyfunctional compound, and a polytetrafluoroethylene, and the polytetrafluoroethylene is dispersed in a state of single particles in the fluoroelastomer layer.

According to the present disclosure, there is further provided a laminate comprising a fluoroelastomer layer and a polymer layer, wherein the fluoroelastomer layer is formed of a fluoroelastomer composition containing a fluoroelastomer, a basic polyfunctional compound, and a polytetrafluoroethylene, and the polytetrafluoroethylene has a specific surface area of less than 8 $m^2/g$.

In the laminate of the present disclosure, it is preferable that the polytetrafluoroethylene has a melt viscosity at 380° C. of $1\times10^1$ to $7\times10^5$ Pa·s.

In the laminate of the present disclosure, it is preferable that the fluoroelastomer composition further contains a peroxide crosslinking agent.

In the laminate of the present disclosure, it is preferable that the polymer layer contains a fluororesin.

In the laminate of the present disclosure, it is preferable that the fluororesin has a fuel permeability coefficient of 2.0 g·mm/$m^2$/day or less.

In the laminate of the present disclosure, it is preferable that the fluoroelastomer layer and the polymer layer are directly adhered to each other.

The laminate of the present disclosure is preferably a tube or hose.

According to the present disclosure, there is further provided an extruded article comprising a fluoroelastomer and a polytetrafluoroethylene, wherein the polytetrafluoroethylene is dispersed in a state of single particles in the extruded article.

According to the present disclosure, there is further provided an extruded article comprising a fluoroelastomer and a polytetrafluoroethylene, wherein the polytetrafluoroethylene has a specific surface area of less than 8 $m^2/g$.

In the extruded article of the present disclosure, it is preferable that the polytetrafluoroethylene has a melt viscosity at 380° C. of $1\times10^1$ to $7\times10^5$ Pa·s.

It is preferable that the extruded article of the present disclosure is formed from a fluoroelastomer composition containing the fluoroelastomer, the polytetrafluoroethylene and a basic polyfunctional compound.

In the extruded article of the present disclosure, it is preferable that the fluoroelastomer composition further contains a peroxide crosslinking agent.

The extruded article of the present disclosure is preferably a tube or hose.

According to the present disclosure, there is further provided an extruded laminate comprising a fluoroelastomer layer formed from the extruded article described above and a polymer layer.

EXAMPLES

Next, the embodiments of the present disclosure are described with reference to Examples, but the present disclosure is not intended to be limited by these Examples.

The parameters in the Examples were determined by the following methods.

<Average Particle Size of PTFE>

Using a laser diffraction type particle size distribution measurement apparatus (manufactured by Japan Laser Corporation), the particle size distribution was determined at a pressure of 0.1 MPa and a measurement time of three seconds without cascade, and the value of 50% of the cumulative volume of particle size distribution was taken as the average particle size.

<Specific Surface Area of PTFE>

The surface roughness was measured by the BET method using a surface analyzer (trade name: BELSORP-mini II, manufactured by MicrotracBEL Corp.). A mixed gas of 30% nitrogen and 70% helium was used as a carrier gas, and liquid nitrogen was used for cooling.

<Melting Point of PTFE>

The melting point of PTFE was determined by temperature calibration using a differential scanning calorimeter RDC220 (DSC) manufactured by SII NanoTechnology Inc, using indium and lead as standard samples in advance, placing about 3 mg of PTFE powder in an aluminum pan (crimp container), heating the temperature range of 250 to 380° C. at 10° C./min under an air flow of 200 ml/min, performing differential scanning calorimetry, and using the minimum point of the heat of melting in the above range as the melting point.

<Melt Viscosity of PTFE>

The measurement was performed by pre-heating a 2-g sample at 380° C. for 5 minutes and keeping it at the above temperature under a load of 0.7 MPa using a flow tester (manufactured by Shimadzu Corporation) and a 2ϕ-8 L die in accordance with ASTM D 1238.

<Burning Weight Loss of PTFE>

PTFE was heated at 300° C. for 2 hours in a hot air circulating electric furnace, and the proportion of the weight loss of the sample after heating with respect to the mass of the sample before heating was calculated.

<Composition of CTFE/TFE/PPVE Copolymer>

The measurement was performed by $^{19}$F-NMR analysis.

<Melt Flow Rate (MFR) of CTFE/TFE/PPVE Copolymer>

The MFR of the CTFE/TFE/PPVE copolymer was determined by measuring the weight (g) of the polymer flowed out of a nozzle (diameter: 2 mm, length: 8 mm) per unit time (10 minutes) at 297° C. under a load of 5 kg using a melt indexer (for example, manufactured by Toyo Seiki Seisaku-sho, Ltd.).

<Fuel Permeability Coefficient>

Pellets of the CTFE/TFE/PPVE copolymer were put into a mold having a diameter of 120 mm and mounted on a press heated up to 300° C. and the pellets were melt-pressed at a pressure of about 2.9 MPa, whereby a sheet having a thickness of 0.12 mm was obtained. This sheet was then processed to have a diameter of 45 mm and a thickness of 120 μm. This sheet was put into a SUS316 permeability coefficient measurement cup having an inner diameter of 40 nmϕ and a height of 20 mm. Here, the cup contained 18 mL of CE10 (fuel prepared by mixing a mixture of isooctane and toluene at a ratio by volume of 50:50 and 10 vol % of ethanol). The mass change at 60° C. was determined for 1000 hours. The fuel permeability coefficient (g·mm/m$^2$/day) was calculated from the mass change per hour (the period during which the mass change is constant at the initial stage of the measurement), and the surface area and thickness of the sheet at the liquid-contact portion.

<Adhesive Strength of Laminate>

The laminate obtained was cut into three strips having a width of 10 mm and a length of 40 mm, and the fluororesin sheet was peeled off to provide a margin for holding, whereby the test pieces were prepared. For each of these test pieces, in order to determine the bond strength of the bonded surface alone without the adhesive strength of the interface between the fluoroelastomer layer and the fluororesin layer, the interface between the fluoroelastomer layer and the fluororesin layer was slowly stretched by hand once to increase the grip section by 2 to 3 mm. Then, the test piece was subjected to a peeling test at 25° C. and a tensile rate of 50 mm/min using an autograph (AGS-J 5 kN, manufactured by Shimadzu Corporation) in conformity with JIS K 6256 (Determination of adhesion strength for vulcanized rubber), whereby the adhesive strength was determined and the average value of data (N=3) was calculated.

<Shrinkage Rate of Fluoroelastomer Layer>

The fluoroelastomer sheets produced in Examples and Comparative Examples were cut into a width of 70 mm and a length of 40 mm in the extrusion direction, and the obtained test pieces were crosslinked at 170° C. for 30 minutes by heating in an electric furnace. The length of the test piece after crosslinking was measured, and the shrinkage rate was calculated by the following formula.

Shrinkage rate (%)=(length of test piece before crosslinking–length of test piece after crosslinking)/(length of test piece before crosslinking)

EXAMPLES AND COMPARATIVE EXAMPLES (Production of Fluororesin Sheet)

A CTFE/TFE/PPVE copolymer having the following physical properties was pressed at 280° C. for 10 minutes to produce a fluororesin sheet (thickness: 0.12 mm).

CTFE/TFE/PPVE=21.3/76.3/2.4 (mol %)

MFR=29.2 g/10 minutes

Fuel permeability coefficient=0.4 g·mm/m$^2$/day (Production of Fluoroelastomer Sheet (Fluoroelastomer Composition))

Details of the materials used to produce the fluoroelastomer composition are shown below.

Fluoroelastomer: Dai-El G902, manufactured by Daikin Industries, Ltd.

Carbon black: Thermax N-990, manufactured by Cancarb Ltd.

Crosslinking aid: triallyl isocyanurate (TAIC), manufactured by Nihon Kasei Co., Ltd.

Crosslinking agent: peroxide-crosslinking agent, Perhexa 25B, manufactured by NOF Corp.

Basic polyfunctional compound: N,N'-dicinnamylidene-1,6-hexamethylenediamine (V-3, manufactured by Daikin Industries, Ltd.)

Phosphine: chlorodiphenylphosphine, manufactured by Tokyo Chemical Industry Co., Ltd.

Silica: Sidistar R300, manufactured by Elkem Corporation

TABLE 1

|  | Average particle size μm | Specific surface area m$^2$/g | Melting point ° C. | Melt viscosity Pa · s | Burning loss wt % |
|---|---|---|---|---|---|
| PTFE(A) | 5.5 | 9.9 | 327 | 24000 | 0.082 |
| PTFE(B) | 5.6 | 13.6 | 327 | 32000 | 0.097 |
| PTFE(C) | 3.4 | 8.5 | 329 | 35700 | 0.153 |
| PTFE(D) | 7.2 | 9.3 | 327 | 26400 | 0.032 |
| PTFE(E) | 10.2 | 5.1 | 327 | 2208 | 0.315 |
| PTFE(F) | 7.7 | 1.6 | 327 | 139 | 0.342 |
| PTFE(G) | 4.2 | 1.5 | 320 | less than 100 | 1.332 |
| PTFE(H) | 10.8 | 2.4 | 331 | 11640 | 0.097 |

(Production of Fluoroelastomer Composition (Fluoroelastomer Sheet))

The materials shown in Table 2 were kneaded using an 8-inch open roll. Thereby, a sheet-shaped fluoroelastomer composition (fluoroelastomer sheet) having a thickness of about 2 mm was obtained.

For the fluoroelastomer composition, the maximum torque value (MH) and the minimum torque value (ML) at 170° C. were determined using MDR (Model: MDR2000 manufactured by Alpha Technologies), and then the induction time (T10) and the optimum vulcanizing time (T90) were determined. The measurement results are shown in Table 2. T10 means the time at which $\{(MH)-(ML)\} \times 0.1 + ML$ equals to the value in the table; T90 means the time at which $\{(MH)-(ML)\} \times 0.9 + ML$ equals to the value in the table; and MH and ML are values determined in conformity with JIS K 6300-2.

(Production of Laminate)

The fluoroelastomer sheet having a thickness of about 2 mm and the fluororesin sheet having a thickness of about 0.12 mm were laminated, and a fluororesin film (thickness: 10 μm) having a width of about 50 mm was inserted between the sheets at an end of the laminate. The resulting laminate was pressed at 170° C. for 30 minutes, whereby a sheet-shaped laminate was obtained. The results are shown in Table 2.

TABLE 2

| | Comparative Example 1 | Comparative Example 2 | Comparative Example 3 | Comparative Example 4 | Comparative Example 5 | Example 1 |
|---|---|---|---|---|---|---|
| Components of fluoroelastomer composition (parts by mass) | | | | | | |
| Fluoroelastomer | 100.0 | 100.0 | 100.0 | 100.0 | 100.0 | 100.0 |
| Carbon black | 20.0 | 20.0 | 20.0 | 20.0 | 20.0 | 20.0 |
| Crosslinking aid | 3.0 | 3.0 | 3.0 | 3.0 | 3.0 | 3.0 |
| Crosslinking agent | 1.5 | 1.5 | 1.5 | 1.5 | 2.0 | 1.5 |
| PTFE(A) | 30.0 | | | | | |
| PTFE(B) | | 30.0 | | | | |
| PTFE(C) | | | 30.0 | | | |
| PTFE(D) | | | | 30.0 | | |
| PTFE(E) | | | | | | 30.0 |
| PTFE(F) | | | | | | |
| PTFE(G) | | | | | | |
| PTFE(H) | | | | | | |
| Basic polyfunctional compound | 3.0 | 3.0 | 3.0 | 3.0 | 3.0 | 3.0 |
| Phosphine | 0.25 | 0.25 | 0.25 | 0.25 | | 0.25 |
| Silica | | | | | | |
| Total | 157.8 | 157.8 | 157.8 | 157.8 | 128.0 | 157.8 |
| Crosslinking properties of fluoroelastomer compositions | | | | | | |
| ML (N) | 1 | 2 | 2 | 2 | 2.0 | 0.4 |
| MH (N) | 25 | 24 | 27 | 26 | 39 | 22 |
| T10 (min) | 1 | 1 | 1 | 1 | 1 | 1 |
| T90 (min) | 4 | 4 | 3 | 4 | 3 | 3 |
| Characteristics of the laminated product | | | | | | |
| Adhesive strength (N/cm) | 20 | 26 | 24 | 28 | 6 | 15 |
| Characteristics of fluoroelastomer layer | | | | | | |
| Shrinkage rate (%) | 49 | 50 | 46 | 50 | 0 | 3 |

| | Example 2 | Example 3 | Example 4 | Example 5 | Example 6 | Example 7 | Example 8 |
|---|---|---|---|---|---|---|---|
| Components of fluoroelastomer composition (parts by mass) | | | | | | | |
| Fluoroelastomer | 100.0 | 100.0 | 100.0 | 100.0 | 100.0 | 100.0 | 100.0 |
| Carbon black | 20.0 | 20.0 | 20.0 | 20.0 | 20.0 | 20.0 | 20.0 |
| Crosslinking aid | 3.0 | 3.0 | 3.0 | 3.0 | 3.0 | 3.0 | 3.0 |
| Crosslinking agent | 1.5 | 1.5 | 1.5 | 1.5 | 2.0 | 1.5 | 1.5 |
| PTFE(A) | | | | | | | |
| PTFE(B) | | | | | | | |
| PTFE(C) | | | | | | | |
| PTFE(D) | | | | | | | |
| PTFE(E) | | | | | | | |
| PTFE(F) | 30.0 | | | 20.0 | 30.0 | 30.0 | 45.0 |
| PTFE(G) | | 30.0 | | | | | |
| PTFE(H) | | | 30.0 | | | | |
| Basic polyfunctional compound | 3.0 | 3.0 | 3.0 | 3.0 | 3.0 | 3.0 | 3.0 |
| Phosphine | 0.25 | 0.25 | 0.25 | | | 0.50 | 0.50 |
| Silica | | | | 20.0 | 20.0 | | |
| Total | 157.8 | 157.8 | 157.8 | 167.5 | 178.0 | 158.0 | 173.0 |
| Crosslinking properties of fluoroelastomer compositions | | | | | | | |
| ML (N) | 0.4 | 0.3 | 0.4 | 1 | 1 | 1 | 2 |
| MH (N) | 24 | 29 | 26 | 38 | 38 | 21 | 48 |

TABLE 2-continued

|  |  |  |  |  |  |  |  |
|---|---|---|---|---|---|---|---|
| T10 (min) | 1 | 1 | 1 | 2 | 1 | 1 | 1 |
| T90 (min) | 4 | 4 | 4 | 7 | 5 | 4 | 2 |
| Characteristics of the laminated product | | | | | | | |
| Adhesive strength (N/cm) | 16 | 15 | 15 | 19 | 22 | 23 | 18 |
| Characteristics of fluoroelastomer layer | | | | | | | |
| Shrinkage rate (%) | 2 | 1 | 17 | 0 | 1 | 3 | 1 |

FIG. 1A is an electron micrograph of a cross-section of a fluoroelastomer sheet produced in Example 2. FIG. 1B is an image in which an element mapping image of a carbon element and a fluorine element is superimposed on the electron micrograph of the cross-section of the fluoroelastomer sheet produced in Example 2. FIG. 2A is an electron micrograph of a cross-section of a fluoroelastomer sheet produced in Comparative Example 1. FIG. 2B is an image in which an element mapping image of a carbon element and a fluorine element is superimposed on the electron micrograph of the cross-section of the fluoroelastomer sheet produced in Comparative Example 1.

The method for confirming the dispersion state of PTFE in the fluoroelastomer layer is not limited, but in Examples and Comparative Examples of the present disclosure, the dispersion state of PTFE was confirmed by specifying the cross-section of PTFE shown in an electronic micrograph with reference to element mapping images of carbon elements and fluorine elements (FIGS. 1B and 2B) and observing the cross-section. Since the content of the carbon element in the PTFE is lower than the content of the carbon element in the fluoroelastomer used in the Examples and the Comparative Examples, and the content of the fluorine element in the PTFE is higher than the content of the fluorine element of the fluoroelastomer used in the Examples and the Comparative Examples, a region where the carbon element is distributed less than other regions and the fluorine element is distributed more than other regions in the element mapping image can be specified as the cross-section of the PTFE dispersed in the fluoroelastomer layer. A scanning electron microscope SU 8020 (manufactured by Hitachi High-Tech Corporation) equipped with an energy dispersive X-ray analyzer (EDS) was used to acquire electron micrographs and element mapping images.

As shown in the electron micrographs of FIGS. 1A and 1B, the fluoroelastomer sheet produced in Example 2 contains PTFE 10 dispersed in the fluoroelastomer, and when the cross-section of the PTFE 10 is observed, it can be seen that the particles are single particles. As shown in the electron micrographs of FIGS. 2A and 2B, PTFE 20 dispersed in the fluoroelastomer was observed in the fluoroelastomer sheet produced in Comparative Example 1 as in the fluoroelastomer sheet produced in Example 2. However, when the cross-section of the PTFE 20 in the fluoroelastomer is observed, a large number of fine particles bonded to each other via elongated branches can be confirmed. In addition, it can be seen that the fluoroelastomer sheet of Example 2 in which PTFE 10 is dispersed in the state of single particles in the fluoroelastomer has a very low shrinkage rate of the fluoroelastomer sheet during crosslinking as compared with the fluoroelastomer sheet of Comparative Example 1 in which PTFE 20 is dispersed such that a large number of fine particles form one lump in the fluoroelastomer.

Furthermore, also in Examples other than Example 2, it was confirmed that PTFE was dispersed in a state of single particles in the fluoroelastomer as in Example 2. It can be seen that the fluoroelastomer sheet of each Example has a very low shrinkage rate during crosslinking as compared with the fluoroelastomer sheet of each Comparative Example.

From the above results, it can be seen that by dispersing PTFE in the state of single particles in the fluoroelastomer layer, it is possible to provide a laminate in which the polymer layer and the fluoroelastomer layer are adhered to each other with sufficient adhesive strength and the shrinkage of the fluoroelastomer layer during crosslinking of the fluoroelastomer can be suppressed.

In addition, from the above results, it can be seen that by dispersing PTFE in the state of single particles in the fluoroelastomer layer, it is possible to provide an extruded article capable of suppressing shrinkage during crosslinking.

The invention claimed is:

1. A tube or a hose comprising a fluoroelastomer and a polytetrafluoroethylene, the tube or the hose being an extruded article obtained by extruding a fluoroelastomer composition to provide an extrudate and crosslinking the extrudate, wherein the polytetrafluoroethylene is dispersed in a state of single particles in the extruded article, and a content of the polytetrafluoroethylene in the extruded article is 10 to 45 parts by mass based on 100 parts by mass of the fluoroelastomer, the fluoroelastomer composition containing the fluoroelastomer, the polytetrafluoroethylene, a basic polyfunctional compound, a peroxide crosslinking agent, and a crosslinking aid.

2. The tube or the hose according to claim 1, wherein the polytetrafluoroethylene has a melt viscosity at 380° C. of $1 \times 10^1$ to $7 \times 10^5$ Pa·s.

3. An extruded laminate comprising a fluoroelastomer layer formed from the tube or the hose according to claim 1 and a polymer layer.

4. The tube or the hose according to claim 1, wherein the fluoroelastomer composition further contains at least one selected from the group consisting of a phosphorus compound and silica.

5. The tube or the hose according to claim 1, wherein the fluoroelastomer composition further contains carbon black.

6. A tube or a hose comprising a fluoroelastomer and a polytetrafluoroethylene, the tube or the hose being an extruded article obtained by extruding a fluoroelastomer composition to provide an extrudate and crosslinking the extrudate, wherein the polytetrafluoroethylene has a specific surface area of less than 8 $m^2/g$, and a content of the polytetrafluoroethylene in the extruded article is 10 to 45 parts by mass based on 100 parts by mass of the fluoroelastomer, the fluoroelastomer composition containing the fluoroelastomer, the polytetrafluoroethylene, a basic polyfunctional compound, a peroxide crosslinking agent, and a crosslinking aid.

7. The tube or the hose according to claim 6, wherein the polytetrafluoroethylene has a melt viscosity at 380° C. of $1\times 10^1$ to $7\times 10^5$ Pa·s.

8. An extruded laminate comprising a fluoroelastomer layer formed from the tube or the hose according to claim 6 and a polymer layer.

9. The tube or the hose according to claim 6, wherein the fluoroelastomer composition further contains at least one selected from the group consisting of a phosphorus compound and silica.

10. The tube or the hose according to claim 6, wherein the fluoroelastomer composition further contains carbon black.

* * * * *